(12) United States Patent
Iwasa et al.

(10) Patent No.: US 7,243,787 B2
(45) Date of Patent: Jul. 17, 2007

(54) MEDICINE BAG

(75) Inventors: Masanobu Iwasa, Higashiosaka (JP); Minoru Honda, Otsu (JP); Masaki Ikenoue, Otsu (JP); Kenji Omori, Kusatsu (JP)

(73) Assignee: Nipro Corporation, Osaka (JP)

( * ) Notice: Subject to any disclaimer, the term of this patent is extended or adjusted under 35 U.S.C. 154(b) by 560 days.

(21) Appl. No.: 10/800,885

(22) Filed: Mar. 15, 2004

(65) Prior Publication Data
US 2004/0188281 A1 Sep. 30, 2004

(30) Foreign Application Priority Data
Mar. 26, 2003 (JP) ............... 2003-086270
Mar. 28, 2003 (JP) ............... 2003-092661
Apr. 4, 2003 (JP) ............... 2003-101632

(51) Int. Cl.
B65D 25/08 (2006.01)
(52) U.S. Cl. ..................... 206/219; 206/221
(58) Field of Classification Search ........... 206/219, 206/221; 604/408, 410, 416
See application file for complete search history.

(56) References Cited

U.S. PATENT DOCUMENTS

| | | | |
|---|---|---|---|
| 4,496,046 A | 1/1985 | Stone et al. | |
| 4,711,359 A | 12/1987 | White et al. | |
| 5,267,646 A * | 12/1993 | Inoue et al. | 206/204 |
| 5,423,421 A * | 6/1995 | Inoue et al. | 206/219 |
| 5,706,937 A * | 1/1998 | Futagawa et al. | 206/221 |
| 5,910,138 A * | 6/1999 | Sperko et al. | 604/408 |
| 5,928,213 A * | 7/1999 | Barney et al. | 604/410 |
| 5,944,709 A * | 8/1999 | Barney et al. | 604/410 |
| 6,017,598 A * | 1/2000 | Kreischer et al. | 428/35.4 |
| 6,117,123 A * | 9/2000 | Barney et al. | 604/410 |
| 6,165,161 A * | 12/2000 | York et al. | 604/408 |
| 6,183,460 B1 | 2/2001 | Smith et al. | |
| 6,203,535 B1 * | 3/2001 | Barney et al. | 604/408 |
| 6,613,036 B1 * | 9/2003 | Farmer et al. | 604/408 |
| 6,764,567 B2 * | 7/2004 | Sperko et al. | 156/229 |
| 6,846,305 B2 * | 1/2005 | Smith et al. | 604/410 |
| 2001/0047162 A1 | 11/2001 | Yugari | |
| 2003/0047467 A1* | 3/2003 | Smith et al. | 206/221 |
| 2003/0116452 A1* | 6/2003 | Saric et al. | 206/219 |

FOREIGN PATENT DOCUMENTS

EP 0 513 364 11/1992

* cited by examiner

Primary Examiner—David T. Fidei
(74) Attorney, Agent, or Firm—Jordan and Hamburg LLP

(57) ABSTRACT

A medicine bag, which includes a bag body having a medicine storage chamber that stores a medicine in such a way that the medicine is visually confirmed through a light-transmission portion provided in at least one part of the bag body, the bag body having a weak seal portion that divides the medicine storage chamber into a plurality of division spaces, and the sealing of the weak seal portion adjacent to a specific division space being removed by increasing the internal pressure of that division space, including: a cover sheet which is peelably attached to the bag body; and a requisitely-used portion which is used in the process shortly before the medicine is administered, in which the cover sheet includes: a light-shielding portion which shields from the light the medicine stored in at least one division space by covering a predetermined part of the light-transmission portion; and a continuously-formed portion which is continuously formed in the light-shielding portion and is placed so that the requisitely-used portion is prevented from being used with the cover sheet kept attached.

18 Claims, 22 Drawing Sheets

MEDICINE BAG

BACKGROUND OF THE INVENTION

1. Field of the Invention

This invention relates to a medicine bag which is used in the medical field or the like, specifically, a medicine bag which is used by providing a weak seal portion that divides its bag body into a plurality of division spaces, removing the sealing of the weak seal portion adjacent to a specific division space by increasing the internal pressure of that division space, and mixing a medicine stored in a predetermined division space.

2. Description of Related Art

As the medicines which are administered to patients by intravenous injections or the like, some are mixed and used with other such medicines. Some of those medicines are unstable, and thus, if mixed beforehand, they may deteriorate as time passes. In the case where such unstable medicines are stored, therefore, a medicine bag is generally used conventionally which has the following configuration. Specifically, several division spaces are formed which store those medicines separately before mixed. When the medicines are used, the division spaces are allowed to lead to each other to mix the medicines stored in each division space.

Some medicines deteriorate as they have been exposed to the light for many hours. If such photo-variable medicines are stored in the above described division spaces, a medicine bag is often used in which the division spaces are covered with a light-shielding layer portion such as an aluminum-foil layer portion.

In such a medicine bag which has the light-shielding layer portion, for example, as disclosed in European Patent Publication No. 0639364A1 or Japanese Design Registration No. 1107140, a weak seal portion which can be peeled divides its bag body into a liquid-medicine storage space that stores a liquid medicine and a medicine storage space that stores a photo-variable dried medicine. The inner wall of this medicine storage space is formed by a transparent flexible sheet. A cover is attached to the bag body so that it can be peeled. Herein, it includes a light-shielding layer portion which is formed by an aluminum film or a colored film that covers the inner wall so that a medicine inside of the inner wall can be shielded from the light.

When this medicine bag is used, usually, the liquid-medicine storage space is pressed by hand to apply pressure to the inside of the liquid-medicine storage space. Then, the weak seal portion is peeled using the pressure of the liquid medicine generated at this time. This allows the liquid-medicine storage space to lead to the medicine storage space, thus mixing the medicines in each storage space. Next, an operation is conducted such as a hole formed in the bag body is hung on a hanger of a bag stand. In order to display the remaining quantity of the medicines mixed in such a way as described above, the total quantity of the medicines before administered are confirmed using a remaining-quantity displaying portion (such as a calibration) which is provided in the bag body. Finally, a tube or the like for injecting a patient with a medicine is connected to a port of the medicine bag, and the medicines mixed in the medicine bag are administered to the patient. On the other hand, in addition to the above described series of operations shortly before administered, the cover is peeled, and then, the state of the medicines, such as how properly they have been mixed and how well they are preserved, is visually confirmed, so that the medicine can be properly administered.

However, in the case where the medicine bag of European Patent Publication No. 0639364A1 is used, even though the need for visual confirmation as described above is called, for example, a user may not peel the cover as the user grows accustomed, or the user may forget carelessly to peel the cover under a complicated situation. In this case, the user may conduct the series of operations without visually confirming medicines in the medicine storage chamber. As a result, the medicines to be essentially mixed may be administered to a patient without mixed, or the medicines which have undergone changes in their outside appearances may be administered to a patient as they are after mixed.

SUMMARY OF THE INVENTION

It is an object of the present invention to provide a medicine bag which is free from the problems residing in the prior art.

According to an aspect of the present invention, a medicine bag includes a bag body and a cover sheet peelably attached to the bag body. The bag body is provided with a medicine storage chamber for storing a medicine in such a way that the medicine is visually confirmed through a light-transmission portion provided in at least one part thereof, a weak seal portion for dividing the medicine storage chamber into a plurality of division spaces, and the sealing of the weak seal portion adjacent to a specific division space being removed by increasing the internal pressure of that division space. The medicine bag is further provided with a requisitely-used portion to be used shortly before the medicine is administered.

The cover sheet includes a light-shielding portion for shielding from the light the medicine stored in at least one division space by covering a predetermined part of the light-transmission portion; and a continuously-formed portion continuously formed in the light-shielding portion for preventing the requisitely-used portion from being used with the cover sheet kept attached.

These and other objects, features and advantages of the present invention will become more apparent upon reading of the following detailed description along with the accompanied drawings.

DETAILED DESCRIPTION OF THE PREFERRED EMBODIMENTS OF THE INVENTION

Medicine bags according to embodiments of the present invention will be described with reference to drawings. In the medicine bags according to these embodiments, description will be given of the case in which two types of medicines of a photo-variable powdered medicine and a dissolution liquid (or a liquid medicine) are mixed (herein, the medicines are used on the basis of a broad concept, including a dissolution liquid or a diluted solution). However, the medicines to be mixed, their properties or types, or the like, are not limited to this. Specifically, as long as a liquid medicine and a medicine to be shielded from the light are included in the medicines to be mixed, they may also be used. For example, a photo-variable liquid medicine may also be mixed with a powdered or solid medicine, a liquid medicine used as a diluted solution, or the like. In addition, the medicines to be mixed may also be three types or more. Herein, the medicine to be shielded from the light includes not only a photo-variable medicine which undergoes variation when exposed to the light, but also a medicine which is covered with a light-shielding sheet such as an aluminum sheet for the purpose of preventing oxidation, moisture absorption and moisture transpiration.

Figure 1:
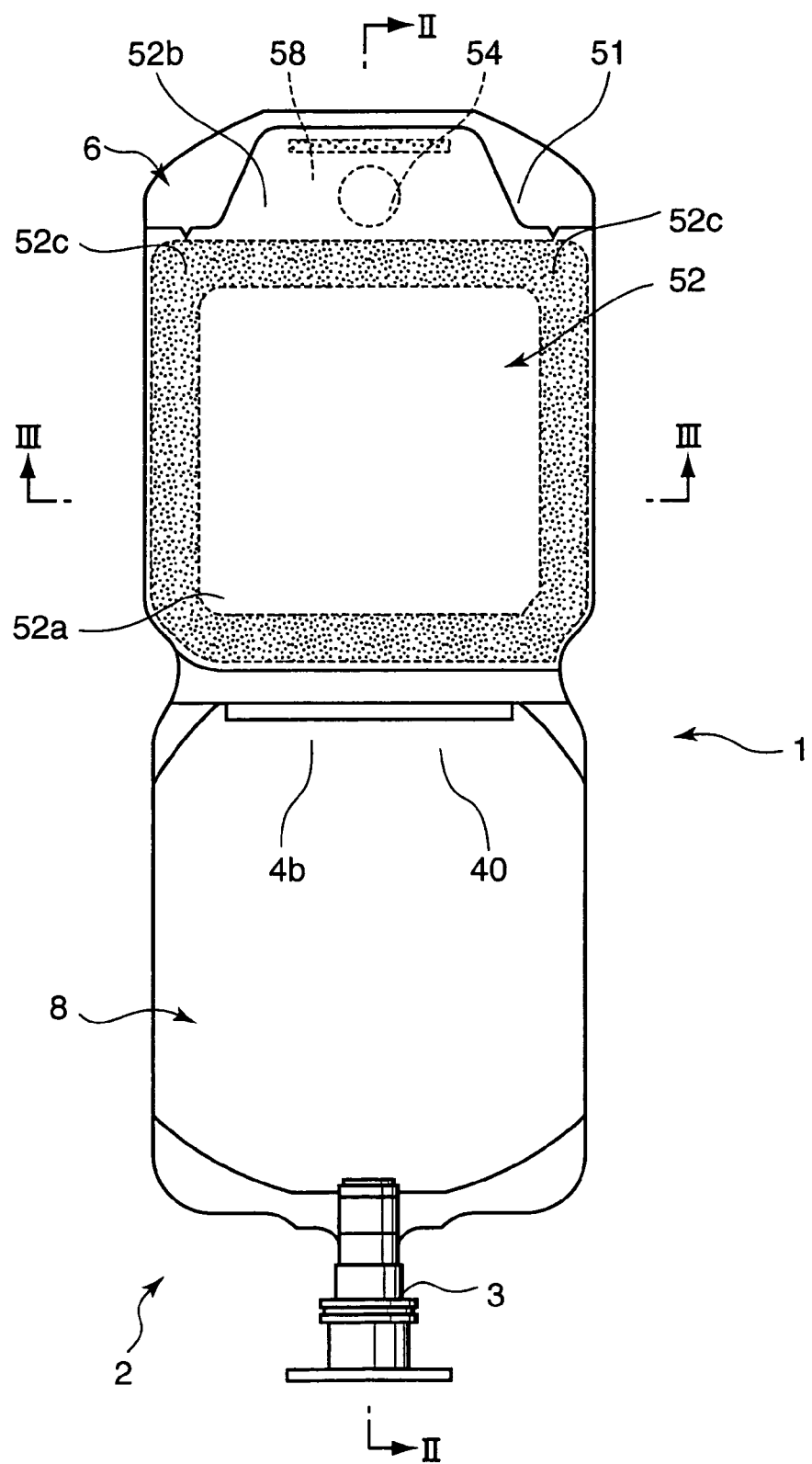
FIG. 1 is a front view of a medicine bag according to a first embodiment of the present invention.
Figure 2:
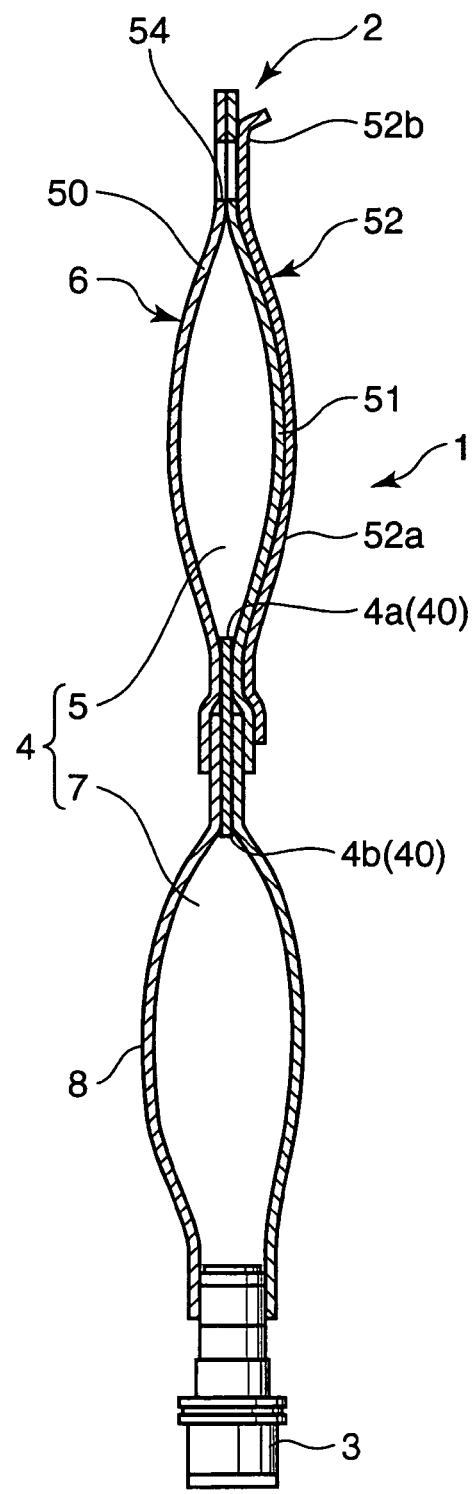
FIG. 2 is a sectional view of the medicine bag, seen along the line II-II in FIG. 1.
Figure 3:
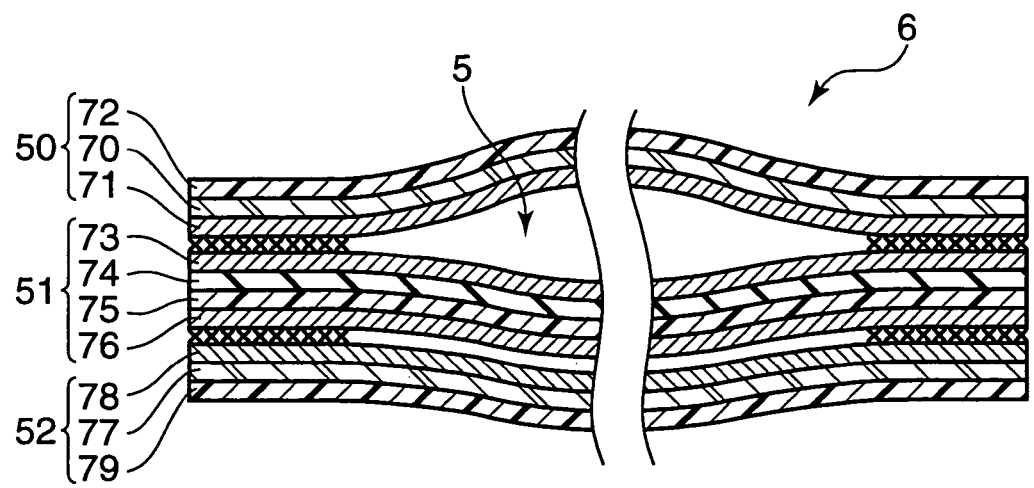
FIG. 3 is a sectional view of the medicine bag, seen along the line III-III in FIG. 1.

Referring to FIGS. 1 to 3 showing a medicine bag according to a first embodiment of the present invention, a medicine bag 1 includes a bag body 2 which has a substantially taller rectangular shape than it is broad if seen head-on, and a port 3 provided in the lower part of this bag body 2.

The bag body 2 is provided with a medicine storage chamber 4 that can store a medicine in such a way that the medicine can be visually confirmed through a light-transmission portion on its inside. This medicine storage chamber 4 is divided into two upper and lower division spaces 5, 7 by weak seal portions 4a, 4b. In this upper division space 5, a photo-variable solid medicine (e.g., minocycline hydrochloride) can be stored, while a dissolution liquid (e.g., physiological saline solution) for this solid medicine can be stored in the lower division space 7. The bag body 2 is provided with an upper storage container 6 which forms the upper division space 5, and a lower storage container 8 which forms the lower division space 7. These storage containers 6, 8 are formed separately beforehand, and are connected so that the division space 5 can lead to the division space 7.

Herein, the number of division spaces, how they are disposed in the bag body 2, or the like, is not limited especially. They are suitably set in consideration of the types of the medicines to be mixed, how they are used, or the like.

The upper storage container 6 is a flexible container which has a substantially square shape if seen head-on. It is configured so that the upper division space 5 cannot transmit moisture, oxygen, and light. This upper storage container 6 includes a rear sheet 50 having a light-shielding layer 70, and a front sheet 51 disposed in front of this rear sheet 50. These rear sheet 50 and front sheet 51 are melted and connected on their peripheries, and thus, are formed like a bag. In a hole forming area at a substantial center of the connection part of their upper-end parts, a hole 54 (or a hanger-hooked portion) which has a predetermined shape (or a circular shape in FIG. 1) is provided so that it penetrates both sheets 50, 51.

Specifically, the rear sheet 50 is configured by a layered sheet which includes: the light-shielding layer 70 which is a shield against the light; and an innermost layer made of a thermoplastic resin that can be melted and strongly attached to the front sheet 51 on its periphery. According to this first embodiment, as shown in FIG. 3, it is configured by piling: in order from the innermost layer, a melting-attachment layer 71 which is made of a thermoplastic resin such as polyethylene, polypropylene and their mixture; the light-shielding layer 70 which is made of PET (poly(ethylene terephthalate)) or nylon that is formed by the vapor deposition of aluminum, aluminum foil, or the like; and a reinforcing layer 72 which is made of PET, nylon, or the like. The light-shielding layer 70 prevents the medicine stored in the upper division space 5 from being exposed to the light through the rear sheet 50. Therefore, the inside of the upper division space 5 cannot be visually confirmed through the rear sheet 50. Herein, according to the first embodiment, this light-shielding layer 70 is configured so as not to transmit moisture and oxygen, too.

The front sheet 51 is a layered sheet which includes an innermost layer made of a thermoplastic resin that can be melted and attached to the rear sheet 50 on its periphery. It is configured as a transparent sheet (including a translucent, or colored transparent, sheet), so that the inside of the upper division space 5 can be visually confirmed through the front sheet 51. In other words, the front sheet 51 corresponds to the light-shielding portion. According to this first embodiment, as shown in FIG. 3, it is configured by piling: in order from the innermost layer, a melting-attachment layer 73 which is made of a thermoplastic resin such as polyethylene, polypropylene and their mixture; a barrier layer 74 which is made of PET or nylon that is formed by the vapor deposition of silica or alumina, EVOH (ethylene vinyl-alcohol copolymer), or the like, and is configured so as not to transmit moisture and oxygen; a reinforcing layer 75 which is made of PET, nylon, or the like; and a weak melting-attachment layer 76 which is made of polyethylene, polypropylene, PET, or the like. For the melting-attachment layer 73 of the front sheet 51, a thermoplastic resin is used which has a high compatibility with the melting-attachment layer 71 of the rear sheet 50. This allows each sheet 50, 51 to be strongly melted and attached (or strongly sealed).

Figure 5:
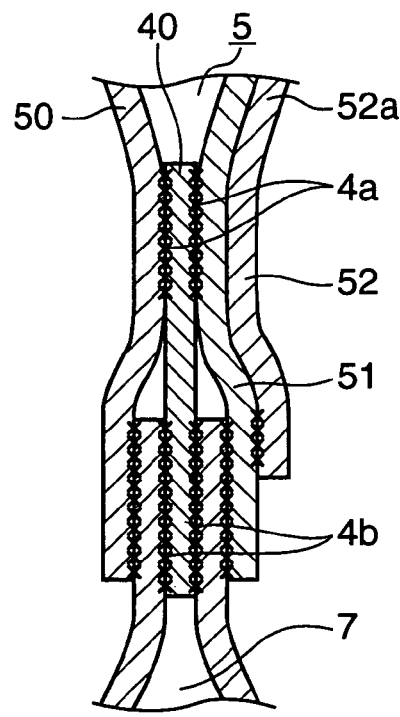
FIG. 5 is an enlarged sectional view, showing how an upper storage container and a lower storage container are connected.

Description will be made about a specific connection structure of the rear sheet 50 and the front sheet 51. In the upper-end part, and right and left-side edge parts of the upper storage container 6, the rear sheet 50 and the front sheet 51 are strongly connected by melting attachment. On the other hand, In the lower-end part of the upper storage container 6, a weak seal sheet 40 is placed between each sheet 50, 51 so that its lower-end part protrudes from their lower-end edges. In the lower-end part of the weak seal sheet 40, each sheet 50, 51 is connected via the weak seal sheet 40 by weak melting attachment (see FIG. 5). In other words, in the lower-end part of the upper storage container 6, the weak seal portion 4a is formed using the weak seal sheet 40. This weak seal portion 4a is configured to be peeled by increasing the internal pressure of at least one of the upper and lower division spaces 5, 7 (i.e., the sealing state is removed). Specifically, this weak seal sheet 40 is made of a thermoplastic resin which has a low compatibility with the thermoplastic resin which makes the melting-attachment layers 71, 73 of the rear sheet 50 and the front sheet 51. For example, if a polyethylene-system synthetic resin is used as the melting-attachment layers 71, 73, the mixture of polyethylene, and the resin which does not have a compatibility with this, such as polypropylene, is preferably used as the weak seal sheet 40. Thus, as the thermoplastic resin which makes the weak seal sheet 40, a thermoplastic resin is used which has a low compatibility with the thermoplastic resin which makes the melting-attachment layers 71, 73. This allows the weak seal portion 4a, which is the melting-attachment part, to be relatively easily peeled.

Furthermore, the upper storage container 6 includes a cover sheet 52 which is attached to the front surface of the front sheet 51 so that it covers the front side of the upper division space 5 and the hole 54.

The cover sheet 52 is configured by a layered sheet which includes: a light-shielding layer 77 which is a shield against the light; and an innermost layer made of a thermoplastic resin which has a low compatibility with the thermoplastic resin which makes the outermost layer (i.e., the weak melting-attachment layer 76 according to this first embodiment) of the front sheet 51. According to the first embodiment, as shown in FIG. 3, the cover sheet 52 is configured by piling: in order from the innermost layer, a weak melting-attachment layer 78; the light-shielding layer 77 which is made of PET (poly(ethylene terephthalate)) or nylon that is formed by the vapor deposition of aluminum, aluminum foil, or the like; and a reinforcing layer 79 which is made of PET, nylon, or the like. As the thermoplastic resin which makes the weak melting-attachment layer 78, there is used a thermoplastic resin which has a low compatibility with the thermoplastic resin which makes the weak melting-attachment layer 76 of the front sheet 51. For example, if the weak melting-attachment layer 76 is made of polyethylene, then polypropylene, polyethylene blended with polypropylene, or the like, is exemplified. This allows the cover sheet 52 to be relatively easily peeled from the front sheet 51.

Herein, the cover sheet 52 is melted and attached at its predetermined part, and thus, is connected to the front sheet 51 so that it can be peeled. However, the specific connection structure of both these sheets 51, 52 is not limited to this. For example, an adhesive layer may also be placed on the connection surface of at least one of the cover sheet 52 and the front sheet 51. In that case, they are connected via this adhesive layer so that they can be peeled.

Specifically, this cover sheet 52 includes a substantially-square light-shielding portion 52a which covers the front side of the upper division space 5, and a continuously-formed portion 52b which is continuously formed at the upper end of this light-shielding portion 52a and covers the above described hole 54 (or hanger-hooked portion). Herein, the continuously-formed portion 52b is symmetrical in the right-and-left directions and is shaped like a tongue. In other words, according to this first embodiment, the hole 54 (or hanger-hooked portion) corresponds to the requisitely-used portion. Herein, according to the first embodiment, as described above, description has been given about the case where the light-shielding portion 52a and the continuously-formed portion 52b are united as the cover sheet 52. However, these may also be formed separately and united by connecting each other.

The light-shielding portion 52a of this cover sheet 52, as shown in FIG. 1 and FIG. 2, is connected to the front sheet 51 so that it covers the front side of the upper division space 5 on its periphery and can be peeled. While this cover sheet 52 is connected to the front sheet 51, the light-shielding layer 77 in the light-shielding portion 5 prevents the medicine stored in the upper division space 5 from being exposed to the light through the front sheet 51. Therefore, the inside of the upper division space 5 cannot be visually confirmed through the front sheet 51. On the other hand, if the cover sheet 52 is peeled, the inside of the upper division space 5 can be visually confirmed through the front sheet 51.

On both sides of the part where the continuously-formed portion 52b is continuously formed in the upper-edge part of the light-shielding portion 52a, a cut portion 52c is provided which is cut in a substantially triangular shape. When the cover sheet 52 is peeled, the light-shielding portion 52a is cut from the cut portion 52c. Then, with the connection parts on both sides of the light-shielding portion 52a kept connected, the light-shielding portion 52a in a middle area in the width directions can be peeled over the full length in the hanging direction of the bag body 2.

The continuously-formed portion 52b of the cover sheet 52 is connected to the front sheet 51 in the opposite position to the light-shielding portion 52a with respect to the above described hole 54, so that it can be peeled. In this connection state, it is configured to cover the hole 54, so that it closes the hole 54, or a hanger such as a bag stand cannot be properly inserted into the hole 54. Accordingly, while the continuously-formed portion 52b is connected to the bag body 2, the hole 54 is prevented from being used, or the hole 54 does not work. If the continuously-formed portion 52b is peeled, that makes it possible to use the hole 54.

Figure 4:
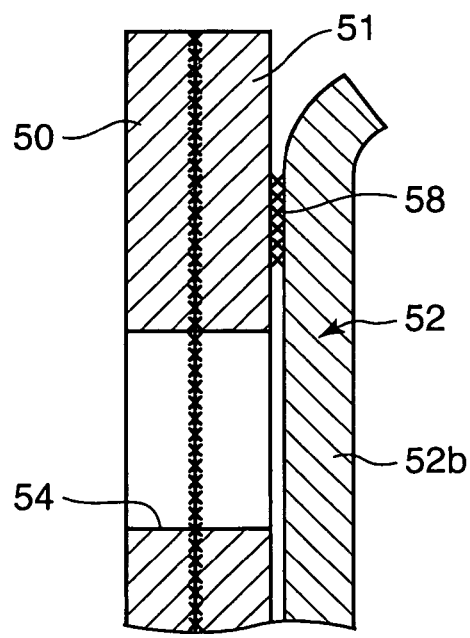
FIG. 4 is an enlarged sectional view of the main part of a cover sheet portion, showing how it is connected.

More specifically, a connection part 58 of the continuously-formed portion 52b, as shown in FIG. 1 and FIG. 4, is in a position apart from the peripheral part of the hole 54, and is formed long and narrow along the upper-edge part of the continuously-formed portion 52b. Thus, if the connection part 58 is formed in a position apart from the peripheral part of the hole 54, that prevents the peeling of the continuously-formed portion 52b from applying an excessive stress on the peripheral part of the hole 54. This effectively prevents the bag body 2 from being torn up, such as peeling between the layers from the peripheral part of the hole 54.

Herein, the shape of the connection part 58 is not limited especially, and is suitably set from the viewpoint of closing the hole 54. Accordingly, the shape of the connection part 58 may also be set, for example, to be circular, elliptical, square, in an arc, in a U-letter, or the like, so that it surrounds the whole, or a part, of the hole 54.

Thus, the upper storage container 6 configured as described above is covered completely or substantially completely with the light-shielding layer portion which includes the light-shielding layer 70 of the rear sheet 50, and the light-shielding layer 77 in the light-shielding portion 52a of the cover sheet 52. In other words, the upper division space 5 inside of the upper storage container 6 is covered with the light-shielding layer portion. This makes it possible to shield the upper division space 5 from the light. Thereby, the medicine stored in the upper division space 5 can be effectively prevented from being exposed to the light and thus under going a change in its outside appearance. In addition, although the upper division space 5 cannot be visually confirmed when the upper division space 5 is covered with the light-shielding layer portion, a part of the light-shielding layer portion is formed into the light-shielding portion 52a which can be peeled. Thus, if the light-shielding portion 52a is peeled, that makes it possible to visually confirm the inside of the upper division space 5. Thereby, the peeling of the light-shielding portion 52a allows the state of the stored medicine to be confirmed, such as how well it is preserved.

On the other hand, the lower storage container 8 is a flexible container which has a substantially square shape if seen head-on. It is configured so as to store a liquid medicine in the above described lower division space 7. In this lower storage container 8, the upper and lower-end parts of the cylindrical sheet which includes a thermoplastic synthetic resin are melted and connected, and thus, are formed like a bag. At a substantially middle part of its lower edge, the above described cylindrical discharge port 3 is connected to the lower division space 7.

The lower storage container 8 is configured by a transparent sheet (including a translucent, or colored transparent, sheet), so that its inside can be visually confirmed. On its side surface, calibrations which indicate its contents, or the like, are printed (not shown). The transparent cylindrical sheet which forms this lower storage container 8 is a sheet which is made of a thermoplastic resin such as polyethylene and polypropylene. Herein, the transparent cylindrical sheet which forms this lower storage container 8 is not limited to this single-layer structure. It may also be configured by the one which has a multi-layer structure, for example, piling: in order from the innermost layer, an interior layer which is made of a thermoplastic resin such as polyethylene; a barrier layer which is made of PET that is formed by the vapor deposition of silica or the like; and an exterior layer which is made of a thermoplastic resin such as polyethylene.

With respect to the specific connection structure of this cylindrical transparent sheet, its lower-end part is strongly connected by melting attachment to the discharge port 3 inserted into it. On the other hand, its upper-end parts are connected by melting attachment, so that the lower-end part of the weak seal sheet 40 which protrudes from the lower edges of the above described upper storage container 6 is placed between them (refer to FIG. 5). In other words, in the medicine bag 1 according to this first embodiment, the melting-attachment process of the lower-end part of the lower storage container 8 and the connection process of both storage containers 6, 8 are simultaneously conducted.

Specifically, the lower-end part of the weak seal sheet 40 is inserted into the upper-end opening part of the lower storage container 8, and the upper-end part of the lower storage container 8 is placed between the rear sheet 50 and the front sheet 51. In this state, the part where they have been placed in layers is melted and attached, thereby connecting the upper storage container 6 and the lower storage container 8. In addition, at this time, the lower-end part of the weak seal sheet 40 is melted and attached to the above described cylindrical transparent sheet, and thus, the weak seal portion 4b is formed. This weak seal portion 4b is configured to be peeled by increasing the internal pressure of the division spaces 5, 7. Hence, the weak seal portion 4b is formed is made of a thermoplastic resin which has a low compatibility with the thermoplastic resin which makes the interior layer of the transparent cylindrical sheet.

Next, description will be given about how to use the medicine bag 1 configured hereinbefore.

First, the hole 54 for hanging the medicine bag 1, especially the bag body 2, is formed with kept penetrated (i.e., with kept usable) by peeling the cover sheet 52.

Specifically, if picking up and pulling down with fingers the part where the continuously-formed portion 52b of the cover sheet 52 is not connected, the continuously-formed portion 52b is peeled from the bag body 2, and thus, the hole 54 is formed with kept penetrated. This continuously-formed portion 52b is united with the light-shielding portion 52a as the cover sheet 52. Therefore, as the continuously-formed portion 52b is pulled, the light-shielding portion 52a can also be peeled together. As a result, a substantially whole surface of the front sheet 51 is exposed. This allows the state of the medicine stored in the upper division space 5, such as how well it is preserved, to be visually confirmed through the front sheet 51.

Then, if the lower storage container 8 of the bag body 2 is pressed by hand, that increases the internal pressure of the lower division space 7. Thereby, the weak seal portions 4a, 4b are peeled, thus allowing the lower division space 7 to lead to the upper division space 5. In this state, if the medicine bag 1 is shaken up and down, the medicines stored in both division spaces 5, 7 are mixed. In other words, the medicine stored in the upper division space 5 is dissolved in a dissolution liquid stored in the lower division space 7. Then, the mixed medicines to be administered to a patient is prepared.

Even in this state, the cover sheet 52 is kept peeled, and thus, the substantially whole surface of the front sheet 51 remains exposed. Therefore, through the front sheet 51, it can be confirmed with high precision the state of each medicine such as how properly they have been mixed, over a substantially full length of the medicine bag 1. For example, it can be easily judged whether or not a part of the medicine still remains indissoluble.

Then, a hanger of a bag stand is inserted into the hole 54 of the bag body 2 to hang the medicine bag 1 (or the bag body 2). Next, a tube or the like is connected to the discharge port 3. Then, the mixed medicines inside of the bag body 2 are administered to a patient through the tube. Herein, for example, a user, such as a doctor and a nurse, may forget carelessly to peel the cover sheet 52 under a complicated situation or the like. In such a case, even if the user tries to hang the medicine bag 1 on the bag stand without mixing the medicines stored in each division space 5, 7, the user cannot hang the medicine bag 1 on the bag stand. This is because the hole 54 is kept covered and closed (i.e., it is prevented from being used) with the continuously-formed portion 52*b* of the cover sheet 52. This means that when the medicines are administered to a patient, the continuously-formed portion 52*b* is certainly peeled. Besides, the continuously-formed portion 52*b* is peeled, and thereby, as described above, the light-shielding portion 52*a* can also be peeled certainly. This enables the user to look at the medicine stored in the upper division space 5 and become aware of the fact that the medicines stored in each division space 5, 7 are not mixed. Accordingly, at this point of time, the user can visually confirm how well the medicine concealed by the light-shielding layers 70, 77 is preserved. Thus, that medicine is mixed with the medicine stored in the lower division space 7. Then, the user can visually confirm how properly they have been mixed.

In short, in the medicine bag 1, the continuously-formed portion 52*b* is peeled as the operation in which the hole 54 is formed which is a part of the operations shortly before administered. As the operation in which the continuously-formed portion 52*b* is peeled is conducted, the light-shielding portion 52*a* can also be peeled certainly. In addition, if the light-shielding portion 52*a* is peeled, then over a substantially whole surface of the front sheet 51 after this light-shielding portion 52*a* has been peeled, the user can visually confirm the state of the medicines, such as how well they are preserved, whether or not their mixing operation has been conducted, and how properly they have been mixed. This makes it possible to properly administer the mixed medicines to a patient.

Hereinbefore, the description has been given of the medicine bag 1 according to the first embodiment. However, this first embodiment can be changed, for example, as described in the following.

(1) According to the first embodiment, the hole 54 is formed beforehand in the area where a hole is formed in the bag body 2, and the position of the continuously-formed portion 52*b* is shifted so that it closes the hole 54. However, such a specific configuration is not limited to this, as long as the continuously-formed portion 52*b* is peeled, and thus, a hole is formed in the hole formation area so that it penetrates that area.

Figure 6:
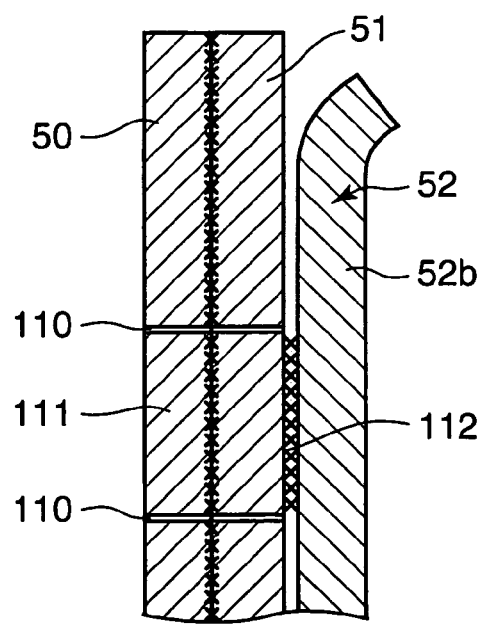
FIG. 6 is an enlarged sectional view of the main part of a cover sheet portion of a medicine bag according to a variation of the first embodiment, showing how it is connected.

For example, as shown in FIG. 6, perforations 110 which run along the periphery of the hole 54 may also be formed beforehand in a hole formation area (or a hanger-hooked portion) 112 provided in the bag body 2. In that case, the continuously-formed portion 52*b* is strongly connected by melting attachment to a bag-body part 111 inside of these perforations 110. If this continuously-formed portion 52*b* is peeled, the bag-body part 111 inside of the hole formation area 112 is cut off to form the hole 54 in the hole formation area 112 so that it penetrates that area 112. In the hole formation area 112, the perforations 110 is only formed, and the hole 54 is not formed. According to such a configuration, before the continuously-formed portion 52*b* is peeled, it cannot be hung on the bag stand or the like. Therefore, the continuously-formed portion 52*b* can be certainly peeled to form the hole 54. This also allows the light-shielding portion 52*a* to be peeled more certainly.

(2) According to the first embodiment, using the cut portion 52*c*, the light-shielding portion 52*a* is peeled only in its middle area in the width directions over the full length in the hanging direction. However, the cut portion 52*c* can be omitted suitably. In other words, in a medicine bag 100 shown in FIG. 7, no cut portion is formed, and instead, the whole of a cover sheet 152 is peeled.

(3) According to the first embodiment, the cover sheet 52 is disposed so that it covers the upper division space 5 along the hanging direction, or so that it extends over the full length in the up-and-down directions of the upper division space 5. However, where and how the cover sheet is disposed is not limited to this. For example, a cover sheet which can be peeled may also be disposed so that it covers only the lower half of the upper division space 5. In that case, the upper half of a front sheet is configured so that it is shielded from the light by a light-shielding layer. Herein, in the same way as the first embodiment, a substantially whole surface of the front sheet is configured as a light-transmission portion. In this light-transmission portion, the cover sheet 52 is disposed so that it covers the upper division space 5. According to such a configuration, when the cover sheet 52 is peeled, the light-transmission portion of the front sheet 51 is exposed over its full length in the hanging direction (or in the up-and-down directions). This makes it possible to visually confirm the inside of the upper division space 5 through the light-transmission portion of the front sheet 51, thereby making the confirmation operation more precise.

(4) According to the first embodiment, the upper division space 5, which is disposed near the hole 54 of both upper and lower division spaces 5, 7, is covered with the light-shielding layers 70, 77 which are light-shielding layer portions. However, the division space which is covered with the light-shielding layer portions is not limited to the upper division space 5. In other words, the lower division space 7 may also be covered with the light-shielding layer portions. Herein, the upper division space 5 is covered with the light-shielding layer portions, and thus, the medicine stored inside is shielded from the light. In that case, the part where the continuously-formed portion extends out can be formed as short as possible. This keeps down the quantity of materials to be used, thus reducing production costs.

Figure 7:
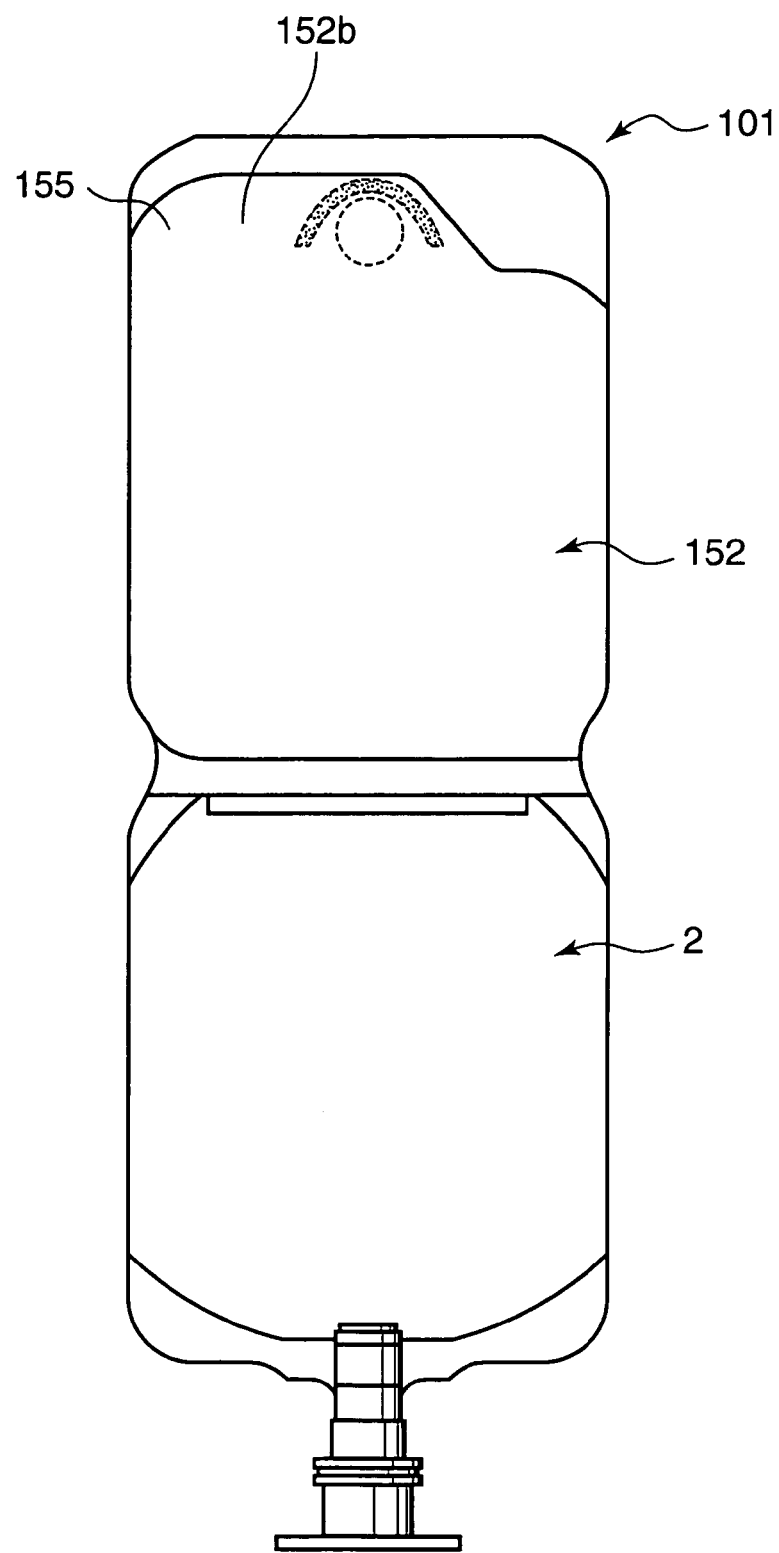
FIG. 7 is a front view of a medicine bag according to another variation of the first embodiment.

(5) Furthermore, as shown in FIG. 7, a continuously-formed portion 152*b* may also be provided with a tab for peeling 155 which is not connected to a front sheet 151. In such a case, a user picks up the peeling tab 155 and peels the cover sheet 152.

(6) According to the first embodiment, the weak seal portions 4*a*, 4*b* are formed by conducting the melting-attachment via the weak seal sheet 40. However, the method of forming the weak seal portions 4*a*, 4*b* is not limited to the one according to the first embodiment.

For example, the heating-and-melting time of the weak seal portions may also be set to be shorter than the other melting-attachment parts; or its melting-attachment pressure or temperature, to be lower than them. This allows them to be peeled by a weaker external force than the other melting-attachment parts.

(7) According to the first embodiment, the front surface of the upper division space 5 is formed by the light-transmission portion (or the front sheet 51), and the light-transmission portion is covered with the light-shielding portion 52*a*. However, the rear sheet may also be formed as a light-transmission portion. In such a case, the light-shielding portion is disposed so that it covers the front sheet and the rear sheet.

(8) In the bag body 2 according to the first embodiment, the upper storage container 6 and the lower storage container 8 are formed separately. Thus, it is formed by connecting these. However, the specific shape of the bag body is not limited especially. For example, two longer rear sheet and front sheet may also be piled. In that case, both these sheets are melted and attached at their predetermined part to divide the inside of the bag body into a plurality of division spaces.

Next, the medicine bag according to a second embodiment of the present invention will be described with reference to FIG. 8 or FIG. 10.

Figure 8:
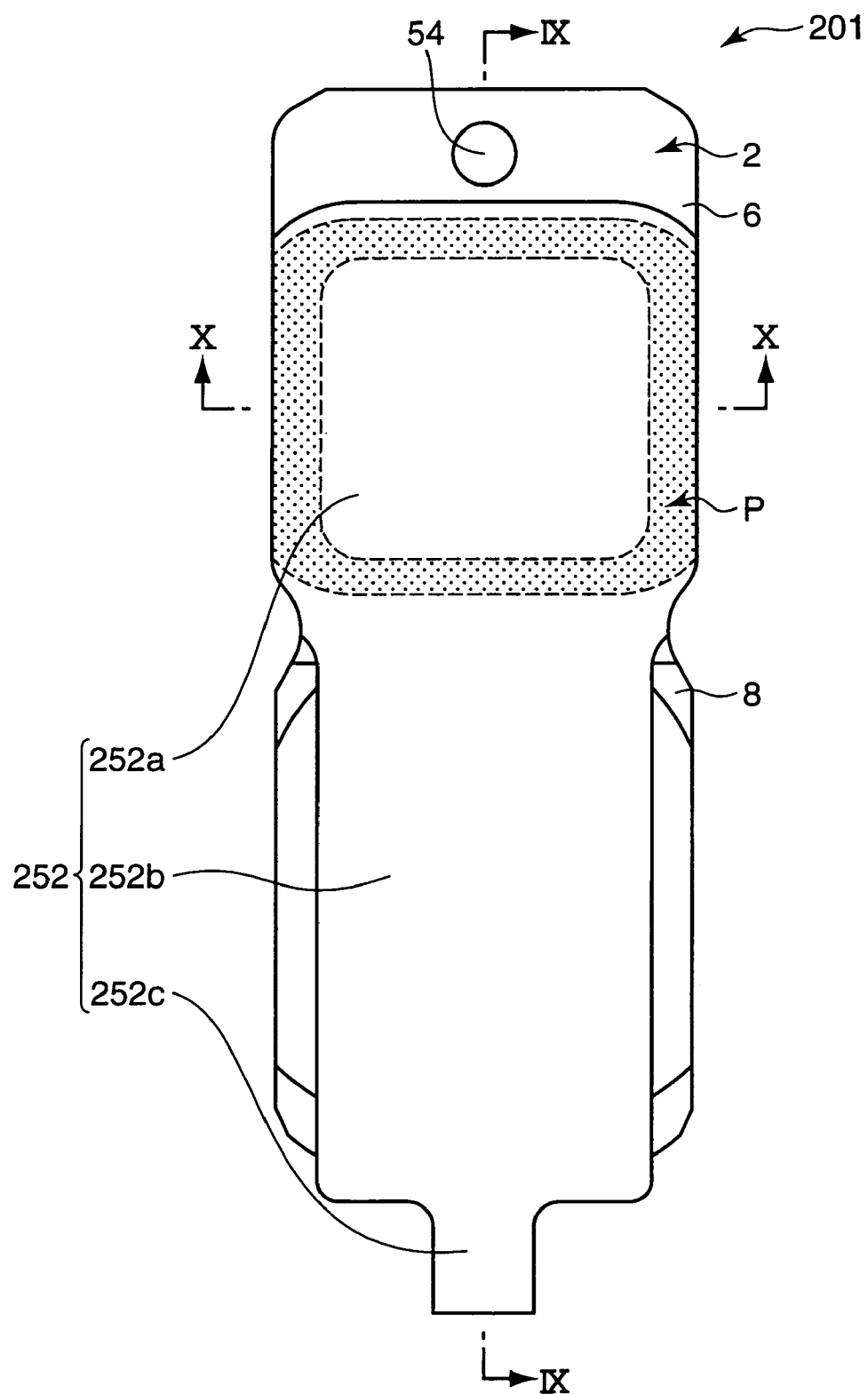
FIG. 8 is a front view of a medicine bag according to a second embodiment of the present invention.
Figure 9:
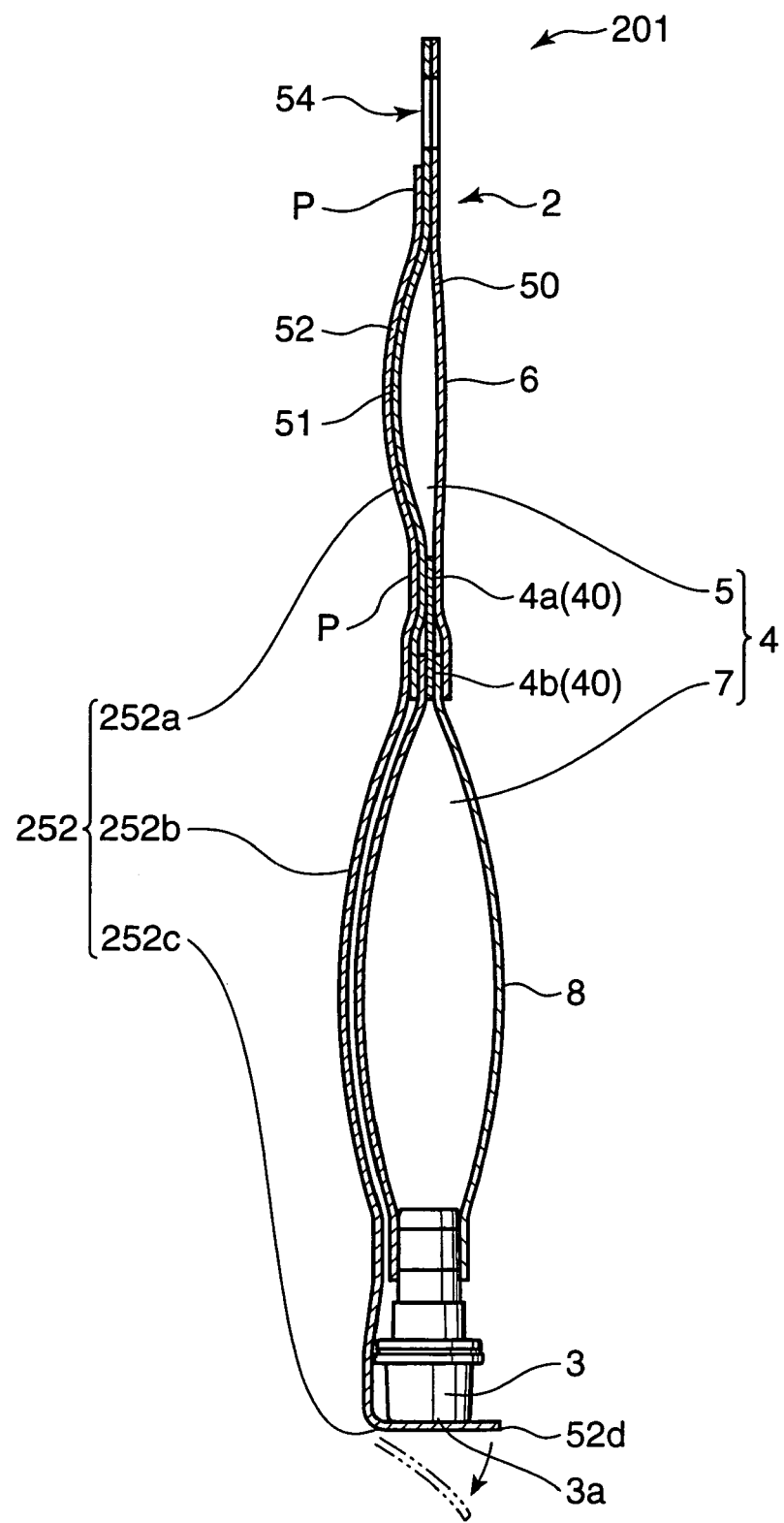
FIG. 9 is a sectional view of the medicine bag, seen along the line IX-IX in FIG. 8.
Figure 10:
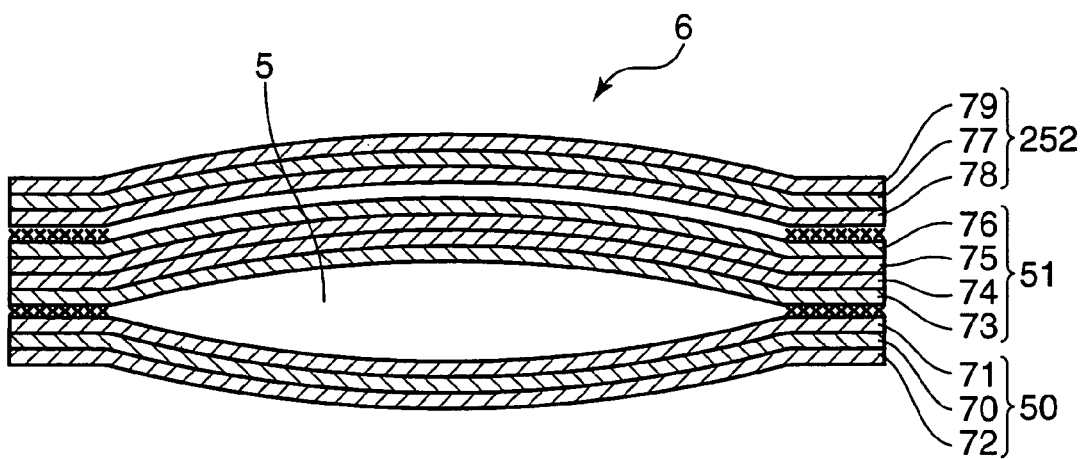
FIG. 10 is a sectional view of the medicine bag, seen along the line X-X in FIG. 8.

Referring to FIGS. 8 to 10 showing a medicine bag according to a second embodiment, a medicine bag 201, in the same way as according to the first embodiment, includes a bag body 2 which has a substantially taller rectangular shape than it is broad if seen head-on, and a discharge port 3 provided in the lower part of this bag body 2.

In medicine bags according to second to seventh embodiments, the requisitely-used portion where the continuously-formed portion of the cover sheet 52 is disposed is the discharge port 3 which is disposed at the lower part of the bag body 2 and discharges the medicine in the medicine storage chamber 4. In this respect, they are extremely different from the medicine bag according to the first embodiment. Hereinafter, description will be given focusing on this point. In the figures, the component parts of the medicine bag according to the second embodiment have the same reference numerals and characters as those according to the first embodiment, as long as they have the same, or substantially same, configurations. In addition, description will be omitted of those same component parts.

Even in the medicine bag according to the second embodiment, the upper storage container 6 is provided with a cover sheet 252 which is connected to the front surface of the front sheet 51 so that it can be peeled. In this connection state, the cover sheet 252 covers the front side of the above described upper division space 5.

This cover sheet 252 includes: a light-shielding portion 252a which shields from the light the photo-variable medicine stored in the upper division space 5, or has the light-shielding layer 77; a tongue portion 252b which extends from the lower end of this light-shielding portion 252a, and is disposed ahead of the lower division space 7; and a port connection portion 252c which extends from this tongue portion 252b to the discharge port 3, and is melted and peelably attached to the discharge port 3, so that it covers an outlet 3a located at the lower end of the discharge port 3. In short, the port connection portion 252c which corresponds to the continuously-formed portion is continuously formed, via the tongue portion 252b, to the light-shielding portion 252a.

Herein, according to this second embodiment, the light-shielding portion 252a, the tongue portion 252b and the port connection portion 252c form the cover sheet 252 as a single sheet. However, the configuration is not limited to this. The light-shielding portion 252a, the tongue portion 252b and the port connection portion 252c may also be separately formed. In that case, these are united and connected to form the cover sheet 252.

The light-shielding portion 252a of the cover sheet 252, as shown in FIG. 8 and FIG. 9, is peelably connected to the front sheet 51, so that its peripheral portion P covers the front side of the upper division space 5.

The tongue portion 252b is set to have a slightly narrower measurement than that of the light-shielding portion 252a. It extends along the front surface of the lower storage container 8 in the up-and-down directions. On the other hand, the port connection portion 252c is set to have a narrower measurement than that of the tongue portion 252b and have a slightly wider measurement than the external diameter of the discharge port 3. The lower-end part of the port connection portion 252c is bent backward. Its upper surface (i.e., its rear surface before bent) is melted and peelably attached to the lower surface of the discharge port 3, so that it covers the outlet 3a of the discharge port 3 which is opened downward. In addition, the rear-end part (i.e., the lower-end part before bent) of the port connection portion 252c extends behind the discharge port 3. This extended part functions as a tab for peeling 252d which is grasped when the port connection portion 252c is peeled from the discharge port 3.

Thus, the upper storage container 6 configured as described above is substantially fully covered with the light-shielding layer 70 of the rear sheet 50 and the light-shielding layer 77 in the light-shielding portion 252a of the cover sheet 252. In other words, the upper division space 5 inside of the upper storage container 6 is covered with the light-shielding portion 252a, and thereby, the inside of the upper division space 5 can be shielded from the light. Thereby, the medicine stored in the upper division space 5 can be prevented from being exposed to the light and thus undergoing a change in its outside appearance. In addition, although in the upper storage container 6, the medicine in the upper division space 5 cannot be visually confirmed when the upper division space 5 is covered with the light-shielding portion 252a, if the light-shielding portion 252a is peeled from the upper division space 5, that makes it possible to visually confirm the inside of the upper division space 5. Thereby, the peeling of the light-shielding portion 252a allows the state of the stored medicine to be confirmed.

On the other hand, the discharge port 3 includes, specifically, the outlet 3a which is opened downward, and a portion to be perforated (not shown) which is disposed inside of this outlet 3a. This perforated portion is made of an elastic synthetic resin or the like. If a sticking needle or the like is stuck through it, the medicine in the medicine storage chamber can be discharged into this needle. On the other hand, if the needle is pulled out of the perforated portion, the outlet 3a is configured to be closed by the restorative force according to its elastic force, so that the medicine in the medicine storage chamber cannot be discharged. According to this second embodiment, the outlet 3a of the discharge port 3 is covered with the port connection portion 252c of the cover sheet 252. Therefore, if the port connection portion 252c is peeled from the discharge port 3, the above described portion to be perforated is exposed, thus making it possible to stick the sticking needle or the like through this perforated portion.

Next, description will be given about the process for using the medicine bag configured as described above. First, in order to expose the portion to be perforated of the discharge port 3, the peeling tab 252d of the port connection portion 252c is grasped and brought down. Thereby, the port connection portion 252c is peeled from the discharge port 3. Then, the port connection portion 252c is moved forward. Thus, the light-shielding portion 252a connected at the peripheral portion P is peeled from the front sheet 51.

Next, if the lower storage container 8 of the bag body 2 is pressed by hand, that increases the internal pressure of the lower division space 7. According to this pressure, the weak seal portions 4a, 4b are peeled, thus allowing the lower division space 7 to lead to the upper division space 5. In this state, if the medicine bag 1 is shaken up and down, the medicines stored in both division spaces 5, 7 are mixed.

Then, the hanger of the bag stand is inserted into the hole 54 of the bag body 2 to hang the medicine bag 1 (or the bag body 2). Next, the sticking needle is stuck through the portion to be perforated of the discharge port 3. Then, the mixed medicines in the bag body 2 to a patient is administered, through a tube which is connected to the sticking needle.

As described above, in the medicine bag 201, the outlet 3a of the discharge port 3 is covered with the port connection portion 252c of the cover sheet 252. In other words, it is attached to the discharge port 3, so that the medicines in the medicine storage chamber 4 can be prevented from being discharged. Therefore, when the medicine bag 1 is used, as the series of operations when the medicines are discharged and administered, the port connection portion 252*c* has to be peeled from the discharge port 3. In the process of peeling the port connection portion 252*c* from the discharge port 3, if the port connection portion 252*c* which forms a part of the cover sheet 252 is peeled from the discharge port 3, that allows the user to recognize the cover sheet 252 is attached to the bag body 2, and that the cover sheet 252 should be peeled from the bag body 2. On the other hand, as described above, if the port connection portion 252*c* is peeled from the discharge port 3, that allows the whole cover sheet 252 including this port connection portion 252*c* to be peeled from the bag body 2. As a result, the light-shielding portion 252*a* of the cover sheet 252 is also peeled from the bag body 2. This allows the user to visually confirm there is the medicine shielded from the light by the light-shielding portion 252*a*.

As described above, in the medicine bag 201, the cover sheet 252 is certainly peeled in the process of the series of operations shortly before administered. This allows the user to visually confirm the state of the medicines, such as how properly they have been mixed and how well they are preserved. As a result, the medicines can be appropriately administered.

In the medicine bag according to the above described second embodiment, the cover sheet 252 is attached to the discharge port 3, so that it covers the outlet 3*a*. However, instead of this configuration, the following configuration can also be used.

Figure 11:
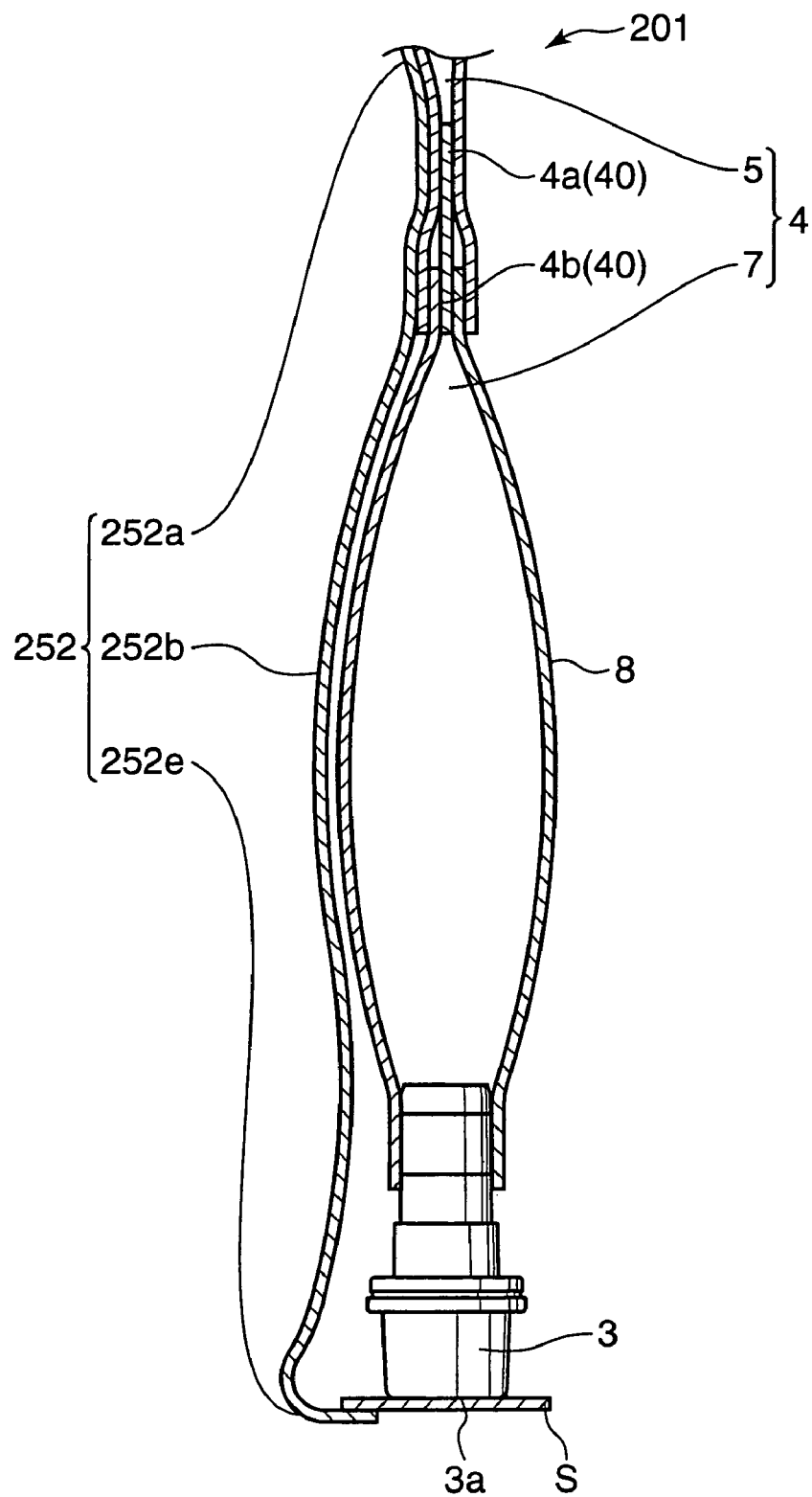
FIG. 11 is a sectional partially schematic view of a medicine bag according to a third embodiment of the present invention.

FIG. 11 is a sectional partially schematic view of a medicine bag according to a third embodiment of the present invention. The bag body 2 and the discharge port 3 have the same configurations as those according to the second embodiment. Hence, with respect to these same configurations, the same reference numerals and characters are given, and their description will be omitted.

With reference to FIG. 11, a tamper seal S is connected to the discharge port 3 of the medicine bag 201 so that it can be peeled. This tamper seal S is disposed to cover the outlet 3*a*. If it is connected to the discharge port 3, that proves the medicine bag 201 is not yet used. In other words, unless the tamper seal S is detached, the sticking needle or the like cannot be stuck into the portion to be perforated of the discharge port 3. Hence, when the medicine bag 201 is used, the tamper seal S is sure to be peeled from the discharge port 3.

On the other hand, the above described cover sheet 252 includes the above described light-shielding portion 252*a* and tongue portion 252*b*. At the lower end of this tongue portion 252*b*, a seal connection portion 252*e* is extended and formed which is fixed to the tamper seal S. This seal connection portion 252*e* is fixed to an end part (or the front-end part in the figure) of the tamper seal S. Therefore, if the tamper seal S is peeled from the discharge port 3 when the medicine bag 1 is used, the position of the seal connection portion 252*e* is shifted together with the tamper seal S.

In the medicine bag 1 configured as described above, the seal connection portion 252*e* of the cover sheet 252 is attached to the tamper seal S detached when the discharge port 3 is used. Therefore, when the medicine bag 1 is used, together with the detachment operation of the tamper seal S which is included in the series of operations shortly before administered for the purpose of discharging the medicines, the position of the seal connection portion 252*e* is also shifted from the bag body 2. Then, if the tamper seal S which the seal connection portion 252*e* is attached to is peeled from the discharge port 3, that allows the user to recognize the cover sheet 252 is attached to the bag body 2, and that the cover sheet 252 should be peeled from the bag body 2. On the other hand, as described above, if the tamper seal S is detached from the discharge port 3, that allows the whole cover sheet 252 including the seal connection portion 252*e* attached to the tamper seal S can be peeled from the bag body 2. As a result, the light-shielding portion 252*a* of the cover sheet 252 is also peeled from the bag body 2. This allows the user to visually confirm there is the medicine shielded from the light by the light-shielding portion 252*a*.

In the medicine bag 1 according to the above described embodiment, as described above, the light-shielding portion 252*a* is connected to the tamper seal S. Therefore, in a conventional process of producing a medicine bag, if the seal connection portion 252*e* is connected to the tamper seal S when the covering of the cover sheet 252 is conducted, that allows the medicine bag 1 according to the present invention to be relatively easily produced, while the conventional method of producing a medicine bag can be maintained as much as possible.

Furthermore, instead of the configurations of medicine bags according to the first to third embodiments, the following configuration can also be used.

Figure 12:
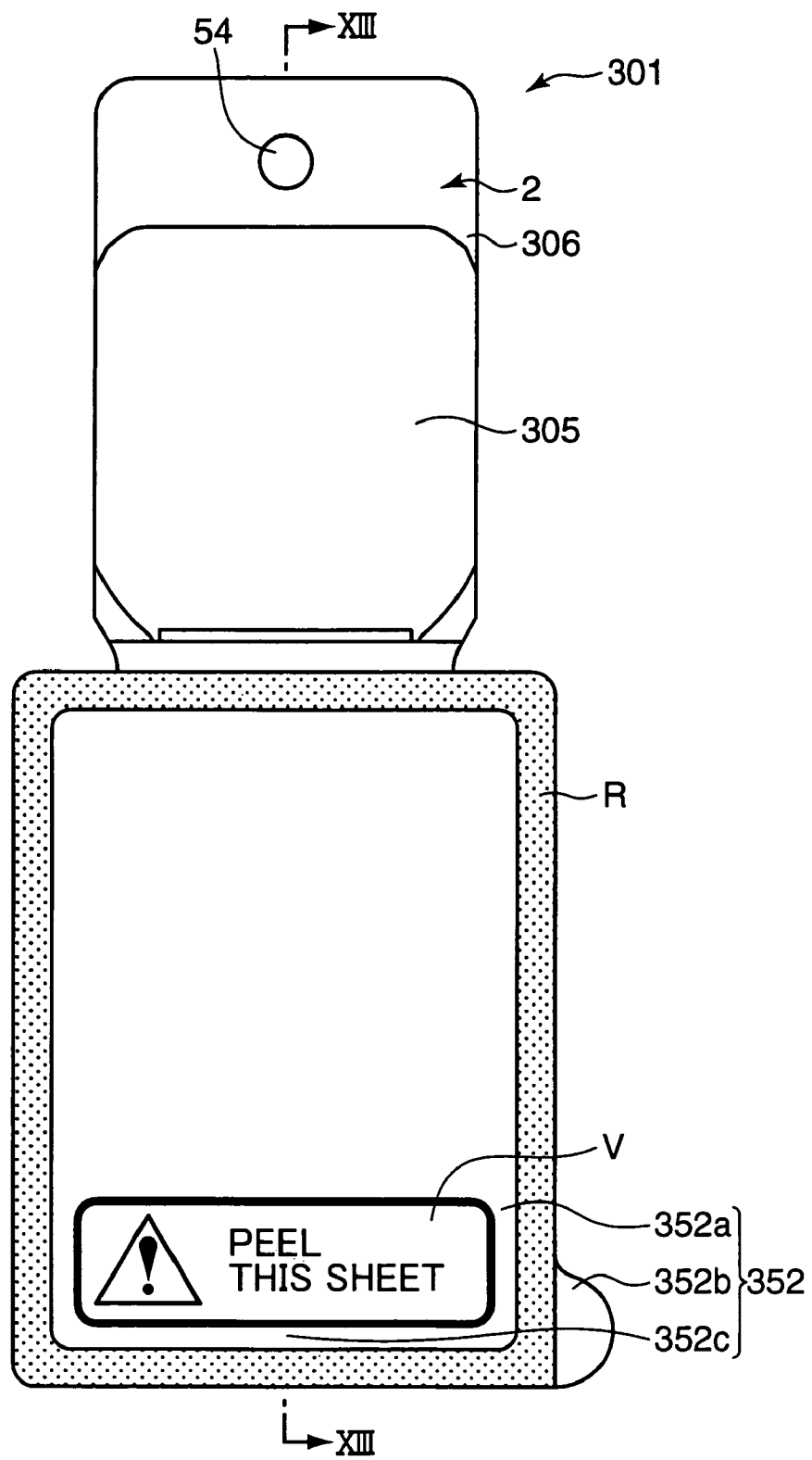
FIG. 12 is a front view of a medicine bag according to a fourth embodiment of the present invention.
Figure 13:
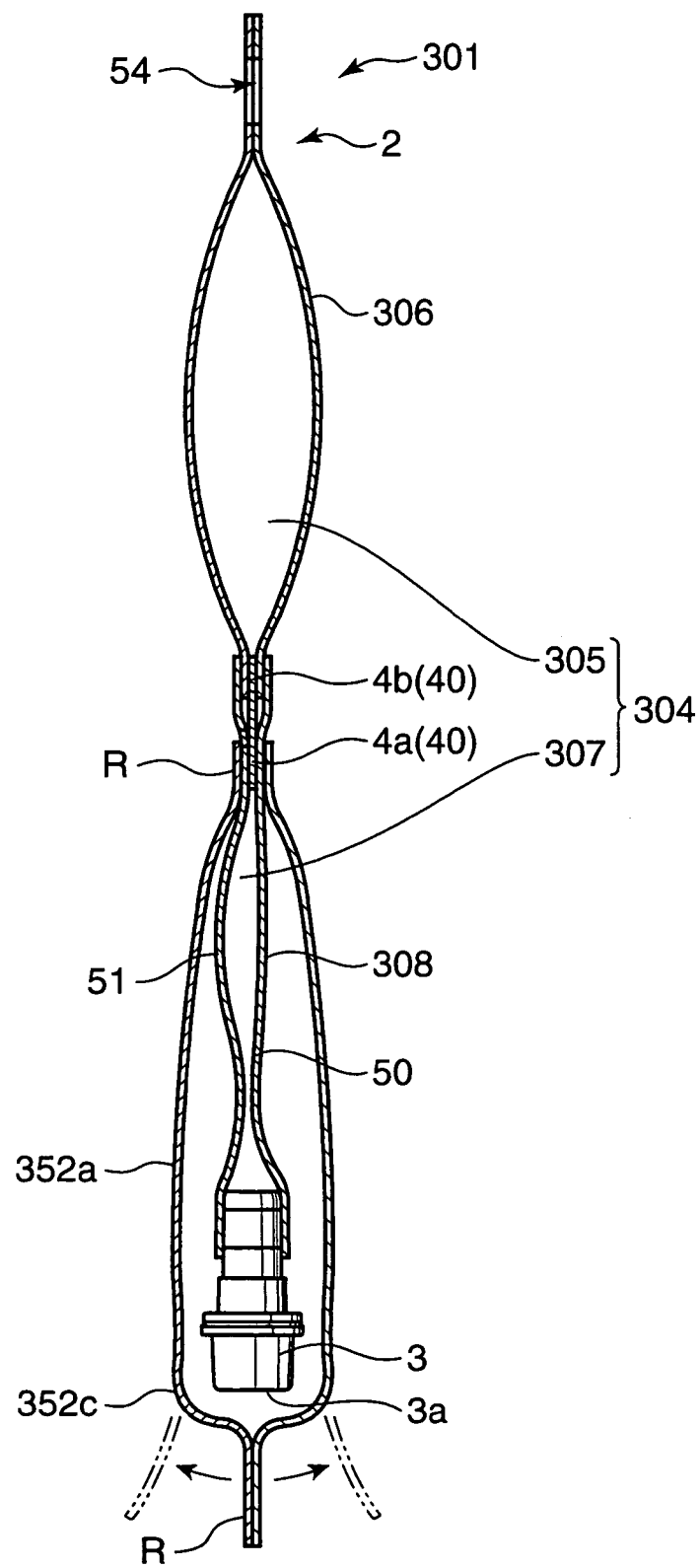
FIG. 13 is a sectional view of the medicine bag, seen along the line XIII-XIII in FIG. 12.

Referring to FIGS. 12 to 13 showing a medicine bag according to a fourth embodiment of the present invention, a medicine bag 301 according to the fourth embodiment has the configuration where the upper storage container 6 and the lower storage container 8 according to the first embodiment are turned over in the up-and-down directions. Specifically, the discharge port 3 is disposed at the lower-end part of a lower storage container 308 according to this embodiment which has a similar configuration to the upper storage container 6. On the other hand, the hole 54 is formed in the upper-end part of an upper storage container 306 according to this fourth embodiment which has a similar configuration to the lower storage container 8. In other words, while a photo-variable powdered medicine is stored in a lower division space 307 of the lower storage container 308, a dissolution liquid for dissolving the powdered medicine is stored in an upper division space 305 of the upper storage container 306. These upper division space 305 and lower division space 307 are formed by dividing a medicine storage chamber 104 inside of the bag body 2 by the weak seal portions 4*a*, 4*b* (located in the position where those of the above described embodiments are turned over in the up-and-down directions).

The medicine bag 301 includes a pair of cover sheets 352 which cover both front and rear sides of the lower division space 307 and the discharge port 3. These cover sheets 352 each includes: a body sheet 352*a* which has substantially the same configuration as the above described light-shielding portion 252*a*, is made of a synthetic resin that does not transmit light, or the like, and has a substantially rectangular shape if seen head-on; and a tab for peeling 352*b* which extends sideward at the lower-end part of this body sheet 352*a*. These body sheets 352*a* are melted and attached to each other at their peripheral portions R, so that they can be peeled. The upper-side parts of these peripheral portions R hold the front sheet 51 and the rear sheet 50 between them, and are melted and attached to those sheets 50, 51 so that they can be peeled.

As described above, each cover sheet 352 covers both front and rear sides of the lower division space 307. Therefore, the medicine in the lower division space 307 is prevented from being exposed to the light through the front sheet 51. As a result, the inside of the lower division space 307 cannot be visually confirmed through the front sheet 51 from the outside of the medicine bag 301. In other words, the part of this body sheet 352*a* which corresponds to the lower division space 307 is equal to the light-shielding portion. On the other hand, if the peeling tabs 352*b* are each pulled and peeled so that they move apart from each other, the melting-attachment part at the peripheral portion R of each cover sheet 352 is peeled, thereby making the lower division space 307 exposed. In this state, the medicine in the lower division space 307 can be visually confirmed through the front sheet 51.

In other words, each cover sheet 352 is configured so as to shift from a covering position where it covers the discharge port 3 to an exposure position where it exposes the discharge port 3. Herein, a shift to the exposure position is made by pulling and peeling each peeling tab 352*b* so that they move apart from each other. Thus, according to this fourth embodiment, the lower-end part of each peeling tab 352*b* forms a port covering portion 352*c* for embodying the covering position and the exposure position. This port covering portion 352*c* corresponds to the continuously-formed portion.

When the medicine bag 301 is used, instead of the operation in which the port connection portion 252*c* is peeled from the discharge port 3 according to the above described embodiment, an operation is conducted in which each cover sheet 352 is peeled from each other, and each port covering portion 352*c* is shifted to the exposure position.

In the medicine bag 301 configured as described above, the port covering portion 352*c* of the cover sheet 352 is disposed so as to shift from the covering position where it covers the discharge port 3 to the exposure position where it exposes the discharge port 3. Therefore, when the medicine bag 301 is used, in order to discharge the medicine, each port covering portion 352*c* in the covering position needs to be shifted to the exposure position. In the process of shifting each port covering portion 352*c* to the exposure position, if the port covering portion 352*c* which forms a part of each cover sheet 352 is peeled (or shifted), that allows the user to recognize the cover sheet 352 is attached to the bag body 2, and that the cover sheet 352 should be peeled from the bag body 2. On the other hand, as described above, if the port covering portion 352*c* is shifted to the exposure position, that allows the whole cover sheet 352 to be peeled from the bag body 2. As a result, the light-shielding portion 252*a* of the cover sheet 252 is also peeled from the bag body 2. This allows the user to visually confirm there is the medicine shielded from the light by the cover sheet 352.

According to the above described fourth embodiment, the pair of cover sheets 352 cover both front and rear-side surfaces of the lower storage container 308. However, instead of this configuration, the following configuration can also be used.

Figure 14:
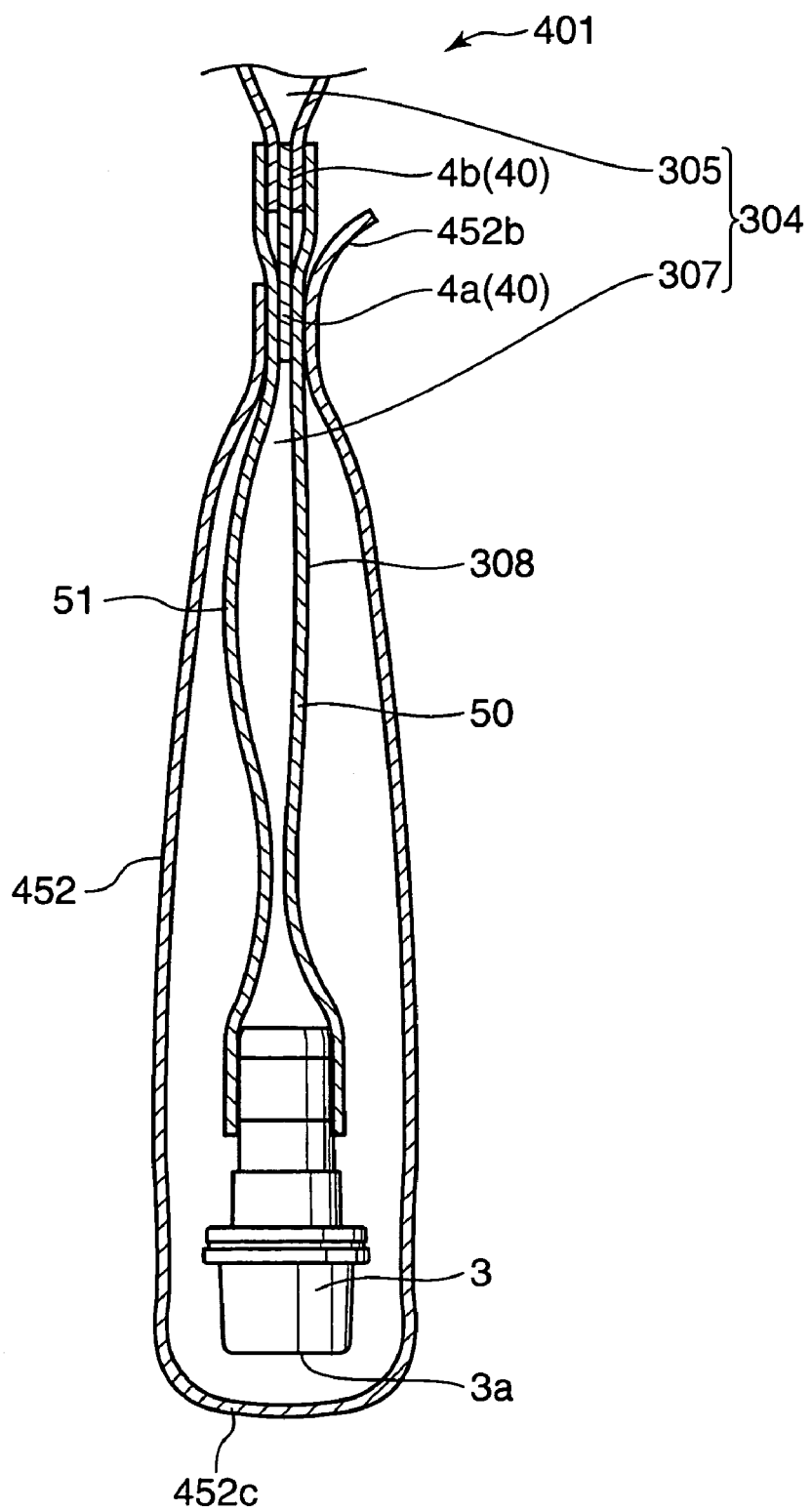
FIG. 14 is a sectional partially schematic view of a medicine bag according to a fifth embodiment of the present invention.

Referring to FIG. 14 showing a medicine bag according to a fifth embodiment, the configurations except the above described cover sheets 352 is the same as the medicine bag 301, and thus, the same reference numerals and characters are given to these configurations and their description is omitted here.

A medicine bag 401 according to this embodiment includes a cover sheet 452, instead of the above described cover sheets 352. This cover sheet 452 has substantially the same configuration as the above described light-shielding portion 52*a*, and is made of a synthetic resin that does not transmit light, or the like. It extends downward from the front upper-end part of the lower storage container 308, is turned up below the discharge port 3, and extends to the rear upper-end part of the lower storage container 308. The cover sheet 452 turned up in this way is melted and attached at each of its upper-side, and both right and left-side, parts, so that they can be peeled. Thus, it as a whole is shaped like a bag. At the melting-attachment place of this upper-side part, it holds the front sheet 51 and the rear sheet 50 between. In other words, the cover sheet 452 is turned up, and its parts are melted and attached so that they can be peeled. Thereby, it is shaped like a bag which houses the lower division space 307 and the discharge port 3. Besides, it is fixed on both front and rear surfaces at the upper-end part of the lower storage container 308. An end part of the cover sheet 452 extends upward from the part where it is melted and attached to the rear surface of the lower storage container 308, and thus, a peeling tab 452*b* is formed.

As described above, the cover sheet 452 covers both front and rear sides of the lower division space 307. Therefore, the medicine in the lower division space 307 is prevented from being exposed to the light through the front sheet 51. As a result, the inside of the lower division space 307 cannot be visually confirmed through the front sheet 51 from the outside of the medicine bag 401. On the other hand, if the peeling tab 452*b* is pulled and peeled so that it moves apart from the bag body 2, the melting-attachment part to the lower division space 30 is peeled. Then, if the position of the cover sheet 452 is shifted downward, the lower division space 307 and the discharge port 3 are exposed. In this state, the medicine in the lower division space 307 can be visually confirmed through the front sheet 51.

In other words, the cover sheet 452 is configured so as to shift from a covering position where it covers the discharge port 3 to an exposure position where it exposes the discharge port 3. Herein, a shift to the exposure position is made by pulling and peeling the peeling tab 452*b* so that it moves apart from the bag body 2. Thus, according to this embodiment, the midway part in which the cover sheet 452 is turned up forms a port covering portion 452*c* for embodying the covering position and the exposure position. This port covering portion 452*c* corresponds to the continuously-formed portion.

When the medicine bag 401 is used, an operation is conducted in which the cover sheet 452 is peeled from the lower division space 307, and the port covering portion 452*c* is shifted to the exposure position.

In the medicine bag 401 configured as described above, the port covering portion 452*c* of the cover sheet 452 is disposed so as to shift from the covering position where it covers the discharge port 3 to the exposure position where it exposes the discharge port 3. This presents the same advantages as those in the above described medicine bag 301.

Furthermore, according to the above described fourth and fifth embodiments, both front and rear-side surfaces of the lower storage container 308 are covered. However, instead of this configuration, the following configuration can also be used.

Figure 15:
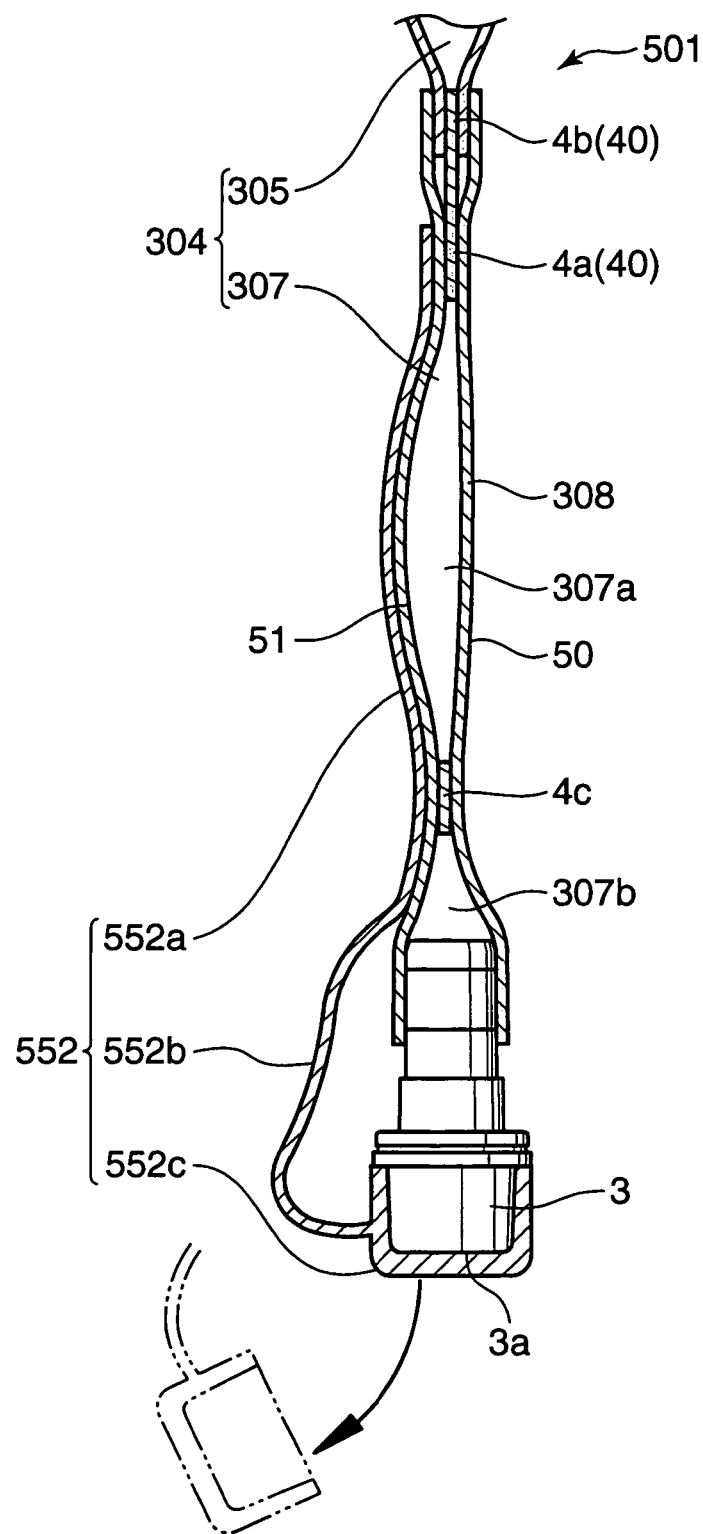
FIG. 15 is a sectional partially schematic view of a medicine bag according to a sixth embodiment of the present invention.

FIG. 15 is a sectional partially schematic view of a medicine bag according to a sixth embodiment of the present invention. Herein, the configurations except the above described cover sheet 452 is substantially the same as the medicine bag 401, and thus, the same reference numerals and characters are given to these configurations and their description is omitted here.

A medicine bag 501 according to this sixth embodiment includes a cover sheet 552, instead of the above described cover sheet 452. The cover sheet 552 includes: a light-shielding portion 552a which has the above described light-shielding layer 77; a tongue portion 552b which extends toward the discharge port 3 from the lower end of this light-shielding portion 552a; and a cap body 552c which is provided at the lower-end part of this tongue portion 552b, and can cap the discharge port 3. The light-shielding portion 552a, in the same way as the above described medicine bag 1, is melted and attached to the lower storage container 308, so that the medicine in the above described lower division space 307 can be shielded from the light. The tongue portion 552b connects the light-shielding portion 552a to the cap body 552c, so that the cap body 552c can be shifted from a covering position in which the cap body 552c covers the discharge port 3 to an exposure position in which it exposes the discharge port 3.

When the medicine bag 501 is used, an operation is conducted in which the cap body 552c in the covering position where the discharge port 3 is covered is detached from the discharge port 3, and then, is shifted to the exposure position where the discharge port 3 is exposed.

In the medicine bag 501 configured as described above, the cap body 552c of the cover sheet 552 is disposed so as to shift from the covering position where it covers the discharge port 3 to the exposure position where it exposes the discharge port 3. This presents the same advantages as those in the above described medicine bag 301 or 401.

In addition, the medicine bag 501 is provided with a weak seal portion 4c. This weak seal portion 4c divides the lower division space 307 into two division spaces 307a, 307b. The division space (hereinafter, called the lower-side division space 307b) which leads to the discharge port 3 of these division spaces 307a, 307b is formed in an empty space where the medicine is not filled.

According to this configuration, even if the series of operations when administered is conducted while the medicines in each division space 307a, 305 are not mixed, the medicines in the medicine storage chamber 104 can be kept because the lower-side division space 307b which leads to the discharge port 3 is formed in an empty space. This prevents the medicines from being improperly administered.

Furthermore, according to the sixth embodiment, the cap body 552c covers the discharge port 3. However, instead of this configuration, a cover sheet which includes the port connection portion 252c can also be used.

Figure 16:
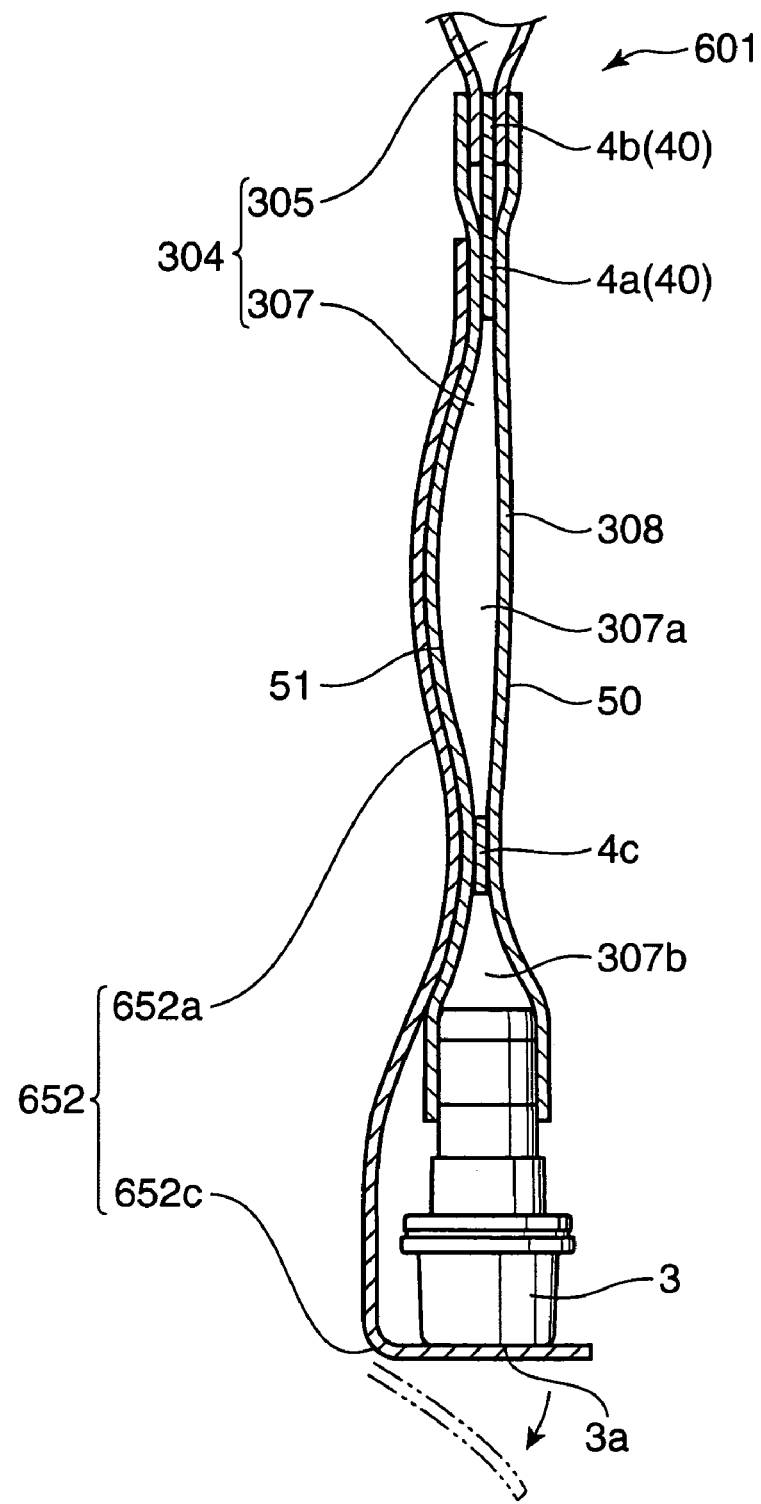
FIG. 16 is a sectional partially schematic view of a medicine bag according to a seventh embodiment of the present invention.

FIG. 16 is a sectional partially schematic view of a medicine bag according to a seventh embodiment of the present invention. Herein, the configurations except the above described cover sheet 552 is substantially the same as the medicine bag 501, and thus, the same reference numerals and characters are given to these configurations and their description is omitted here.

A medicine bag 501 according to this sixth embodiment includes a cover sheet 652, instead of the above described cover sheet 552. The cover sheet 652 includes: a light-shielding portion 652a which has the above described light-shielding layer 77; and a port connection portion 652c which extends from the lower end of this light-shielding portion 652a, and in the same way as the above described port connection portion 252c (see FIG. 9), is melted and peelably attached to the discharge port 3, so that it covers the outlet 3a. The light-shielding portion 652a, in the same way as the above described medicine bag 1, is melted and attached to the lower storage container 308, so that the medicine in the above described lower division space 307 can be shielded from the light.

When the medicine bag 601 is used, the light-shielding portion 652a of the cover sheet 652 is peeled from the discharge port 3, and the light-shielding portion 652a is peeled from the lower storage container 308.

In the medicine bag 601 configured as described above, the light-shielding portion 652a of the cover sheet 652 covers the outlet 3a of the discharge port 3. Thus, it is attached to the discharge port 3, so that the medicines in the medicine storage chamber 104 can be prevented from being discharged. This presents the same advantages as those in the above described medicine bag 201.

In addition, the medicine bag 601, in the same way as the above described medicine bag 501, is provided with a weak seal portion 4c. Therefore, even if the series of operations when administered is conducted while the medicines in each division space 307a, 305 are not mixed, the medicines can be prevented from being improperly administered because the lower-side division space 307b which leads to the discharge port 3 is formed in an empty space.

Herein, in the medicine bags according to the above described second to seventh embodiments, on the outside of the above described port connection portion 252c, port covering portions 352c, 452c and seal connection portion 252e (i.e., on the surface on the side where they move away from the bag body 2), for example, as shown in FIG. 12, a notification column V can also be formed which displays the fact that the cover sheets 252, 352, 452, 552 need to be peeled from the bag body 2.

According to this configuration, if the port connection portion 252c, the port covering portions 352c, 452c and the seal connection portion 252e are operated in the process of the series of operations shortly before administered, that allows the user to recognize that the cover sheets 252, 352, 452, 552 should be peeled from the bag body 2. Furthermore, in the medicine bags 301, 401 according to the above described fourth and fifth embodiments, the cover sheets 352, 452 cover both front and rear-side surfaces of the lower storage container 308. Therefore, the above described rear sheet 50 not necessarily needs to have a light-shielding property. If the rear sheet 50 is made of a light-transmissible resin, through both sides of the front sheet 51 and the rear sheet 50, the state of the medicine inside of them can be confirmed. As a result, when the remaining quantity of the medicine is confirmed, labor such as turning over the bag body 2 can be saved. This also enables the user to suitably confirm how the medicines are injected, thereby making the patient free from care when the medicines are injected. Herein, in this case, the front sheet 51 and the rear sheet 50 of the lower storage container 308 correspond to the light-transmission portion. Through the light-transmission portion, the medicine stored in the lower storage container 308 can be visually confirmed.

Moreover, in the medicine bags 301, 401 according to the above described fourth and fifth embodiments, the cover sheets 352, 452 cover both front and rear-side surfaces of the lower storage container 308. Therefore, in the space which is outside of the lower storage container 308 and is covered with the cover sheets 352, 452, for example, a deoxidation agent or a desiccating agent can be placed. Thereby, even if the medicine in the lower storage container 308 has the property of being easily oxidized or absorbing moisture, the medicine can be prevented from being oxidized or absorbing moisture while the medicine bag is kept in storage.

In addition, according to each of the above described embodiments, the melting-attachment is conducted via the weak seal sheet 40 to form the weak seal portions 4a, 4b. However, the configuration is not limited to this. For example, the heating-and-melting time of the weak seal portions may also be set to be shorter than the other melting-attachment parts; or its melting-attachment pressure or temperature, to be lower than them. This allows them to be peeled by a weaker external force than the other melting-attachment parts. Furthermore, in the bag body 2 according to the second to seventh embodiments, the upper storage containers 6, 306 and the lower storage container 8, 308 are formed separately. Thus, it is formed by connecting these. However, the specific shape of the bag body is not limited especially. For example, two longer rear sheet and front sheet may also be piled. In that case, both these sheets are melted and attached at their predetermined part to divide the inside of the bag body 2 into a plurality of division spaces.

Moreover, according to the above description, the light-shielding portions 252a, 552a, 652a and the body sheet 352a each shield a photo-variable medicine. However, the configuration is not limited to this. For example, an aluminum sheet or the like which covers the medicine may also form the cover sheet for the purpose of preventing each of the oxidation, moisture absorption and transpiration of the medicine. In other words, the light-shielding portions 252a, 552a, 652a and the body sheet 352a may only cover the medicine in such a way that it cannot be visually confirmed from the outside.

Next, description will be given about a medicine bag according to an eighth embodiment of the present invention with reference to FIG. 17 to FIG. 19.

As shown in these figures, a medicine bag 701 according to the eighth embodiment, in the same way as the first embodiment, a medicine bag 1 includes a bag body 2 which has a substantially taller rectangular shape than it is broad if seen head-on, and a port 3 provided in the lower part of this bag body 2.

According to the eighth to eleventh embodiments, the requisitely-used portion where the continuously-formed portion of the cover sheet 52 is disposed is the remaining-quantity displaying portion which displays the remaining quantity of the medicine stored in the medicine storage chamber 4. In this respect, it is extremely different from that according to the first embodiment. Hereinafter, description will be given focusing on this point. In the figures, the component parts of the medicine bag according to the eighth embodiment have the same reference numerals and characters as those according to the first embodiment, as long as they have the same, or substantially same, configurations. In addition, description will be omitted of those same component parts.

Even according to the eighth embodiment, the lower storage container 8 is provided which forms the lower division space 7.

On the side surface of the lower storage container 8, a calibration portion M1 is printed which indicates the height level of the remaining quantity of medicine in the medicine storage chamber 4. In addition, a remaining-quantity numerical-value portion S1 is printed which corresponds to the calibration portion M1 and shows a numerical value of the remaining quantity of medicine. In other words, the calibration portion M1 indicates the height level of the mixed medicine obtained by mixing the medicine in the upper division space 5 with the medicine in the lower division space 7. The remaining-quantity numerical-value portion S1 shows the quantity of the medicines which corresponds to this height level using numerical values. According to this embodiment, in the remaining-quantity numerical-value portion S1, three numerical values of 75 mL, 50 mL and 25 mL are disposed in the up-and-down directions. In the positions which correspond to these, the calibration portion M1 is formed in the up-and-down directions. Herein, according to this embodiment, the calibration portion M1 and the remaining-quantity numerical-value portion S1 form an example of a remaining-quantity displaying portion H.

On the other hand, in the upper storage container 6, in the same way as the first embodiment, a cover sheet 752 is attached to the front surface of the front sheet 51 so that it can be peeled.

This cover sheet 752 includes: a light-shielding portion 752a which shields from the light the photo-variable medicine stored in the division space 5, or has the light-shielding layer 77; and a concealing portion 752b (or the continuously-formed portion) which extends from the lower end of this light-shielding portion 752a, and is disposed ahead of the lower division space 7 so that it prevents the remaining-quantity displaying portion H from being used (i.e., from being viewed). According to the eighth embodiment, the concealing portion 752b and the lower storage container 8 are kept unconnected. Thus, the concealing portion 752b functions as a grasp tab for peeling the light-shielding portion 752a from the front sheet 51.

Figure 17:
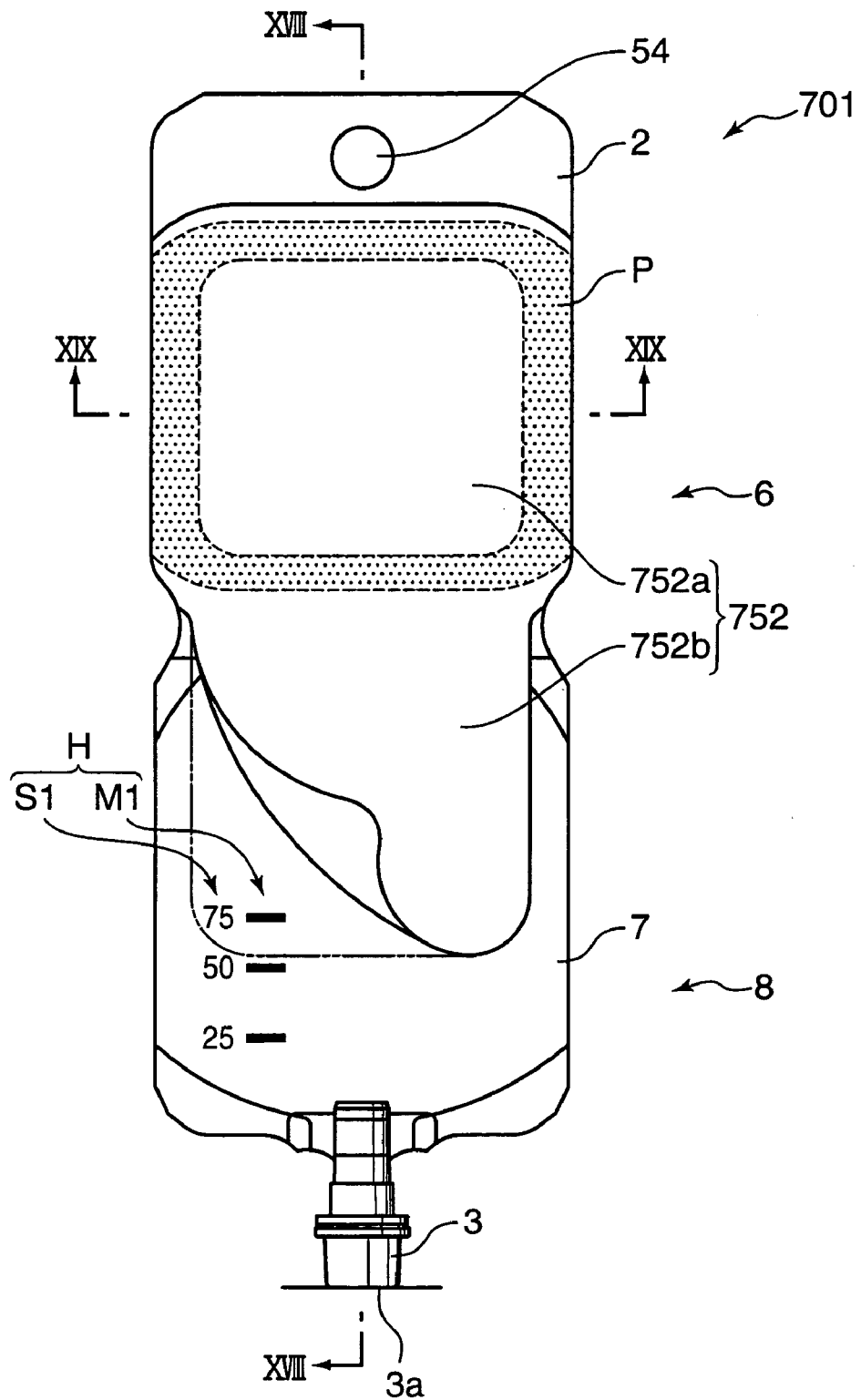
FIG. 17 is a front view of a medicine bag according to an eighth embodiment of the present invention.
Figure 18:
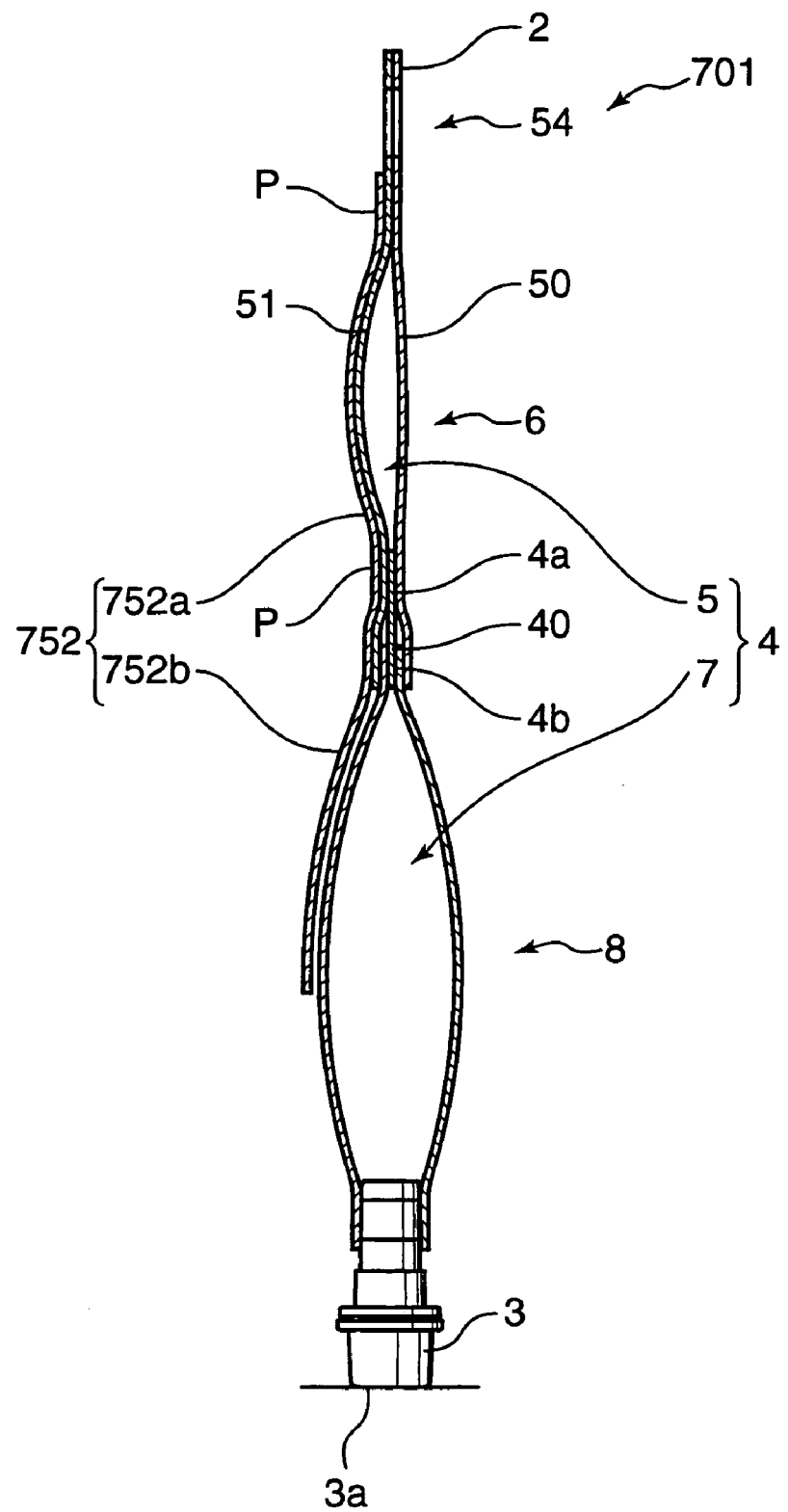
FIG. 18 is a sectional view of the medicine bag, seen along the line XVIII-XVIII in FIG. 17.
Figure 19:
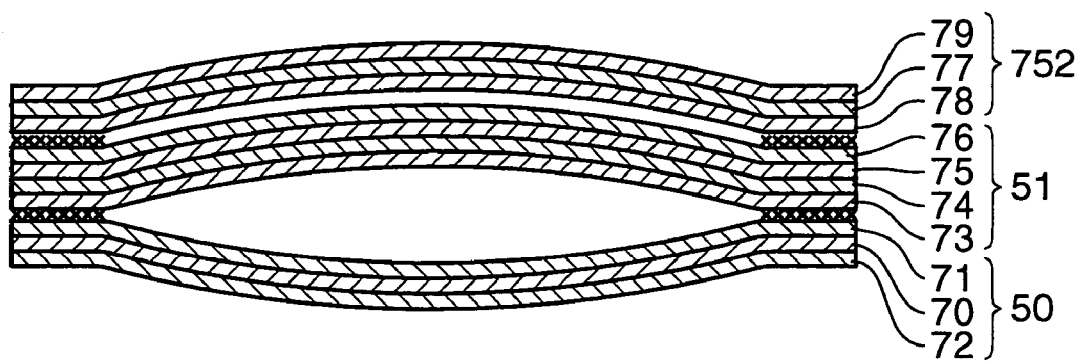
FIG. 19 is a sectional view of the medicine bag, seen along the line XIX-XIX in FIG. 17.

The light-shielding portion 752a of the cover sheet 752, as shown in FIG. 17 and FIG. 18, is peelably connected to the front sheet 51, so that its peripheral portion P covers the front side of the upper division space 5. When the light-shielding portion 752a is connected to the front sheet 51, the light-shielding layer 77 in the light-shielding portion 752a prevents the medicine stored in the upper division space 5 from being exposed to the light through the front sheet 51. As a result, the inside of the upper division space 5 cannot be visually confirmed through the front sheet 51 from the outside of the medicine bag 1. On the other hand, if the cover sheet 752 is peeled, the inside of the upper division space 5 can be visually confirmed through the front sheet 51.

The concealing portion 752b is set to have a slightly narrower measurement than that of the light-shielding portion 752a. It extends along the front surface of the lower storage container 8 in the up-and-down directions. According to the eighth embodiment, the concealing portion 752b extends to a midway part of the lower storage container 8, so that it conceals the part of 75 mL in the remaining-quantity numerical-value portion S1 and the calibration portion M1 which corresponds to this.

Next, description will be given about the process for using the medicine bag 701 configured as described above.

First, in order to confirm the total quantity of the medicines in the medicine storage chamber 4, as described above, it is performed to pull up the concealing portion 752b which conceals the calibration portion M1 and the remaining-quantity numerical-value portion S1. Thereby, the light-shielding portion 752a connected at the peripheral portion P is also peeled from the front sheet 51.

Next, if the lower storage container 8 of the bag body 2 is pressed by hand, that increases the internal pressure of the lower division space 7. According to this pressure, the weak seal portions 4a, 4b are peeled, thus allowing the lower division space 7 to lead to the upper division space 5.

Then, the hanger of the bag stand is inserted into the hole 54 of the bag body 2 to hang the medicine bag 1 (or the bag body 2). Next, the sticking needle is stuck through the portion to be perforated of the discharge port 3. Then, the mixed medicines in the bag body 2 to a patient is administered, through a tube which is connected to the sticking needle.

As described above, in the medicine bag 1, the concealing portion 752*b* of the cover sheet 752 is configured to conceal at least one part (or the remaining-quantity numerical-value portion S1 of 75 mL and the calibration portion M1 which corresponds to this) of the remaining-quantity displaying portion H disposed in the lower storage container 8. Therefore, when the medicine bag 701 is used, as the series of operations shortly before administered for the purpose of discharging the medicine, the remaining quantity of the medicine is confirmed using the remaining-quantity displaying portion H. To do that, the remaining-quantity displaying portion H has to be exposed from the concealing portion 752*b*. In the process of exposing the remaining-quantity displaying portion H from the concealing portion 752*b*, if the position of the concealing portion 752*b* which forms a part of the cover sheet 752 is shifted from the bag body 2, that allows the user to recognize the cover sheet 752 is attached to the bag body 2, and that the cover sheet 752 should be peeled from the bag body 2. On the other hand, as described above, if the concealing portion 752*b* is peeled from the bag body 2, that allows the whole cover sheet 752 including this concealing portion 752*b* to be peeled from the bag body 2. As a result, the light-shielding portion 752*a* of the cover sheet 752 is also peeled from the bag body 2. This allows the user to visually confirm there is the medicine shielded from the light by the light-shielding portion 752*a*.

As described above, in the medicine bag 701, the cover sheet 752 is certainly peeled in the process of the series of operations shortly before administered. This allows the user to visually confirm the state of the medicines, such as how properly they have been mixed and how well they are preserved. As a result, the medicines can be appropriately administered.

In the medicine bag according to the above described eighth embodiment, the concealing portion 752*b* is configured so that it conceals the remaining-quantity numerical-value portion S1 of 75 mL and the calibration portion M1 which corresponds to this. However, instead of this configuration, the following configuration can also be used.

Figure 20:
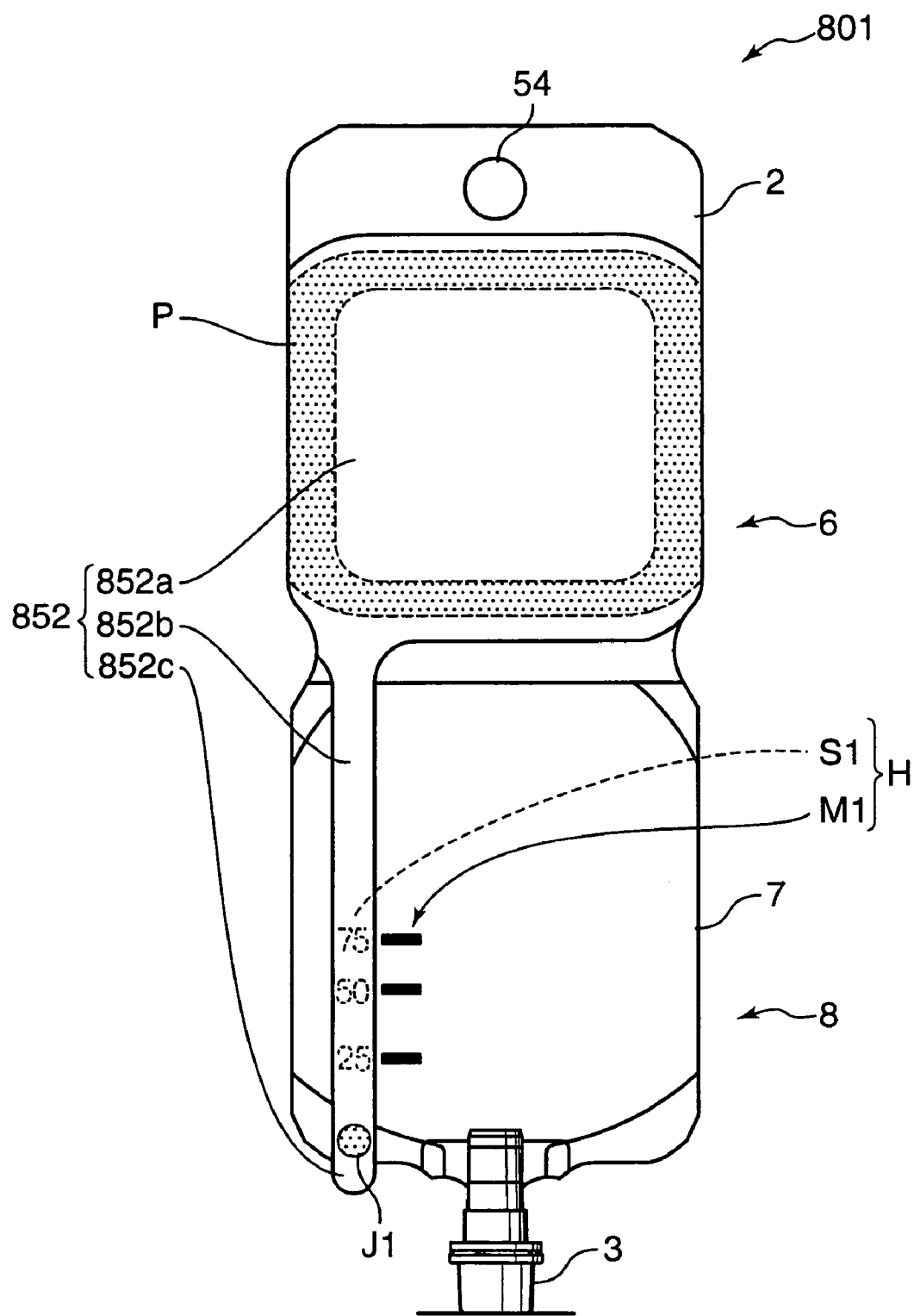
FIG. 20 is a front view of a medicine bag according to a ninth embodiment of the present invention.

FIG. 20 is a front view of a medicine bag according to a ninth embodiment of the present invention. Herein, the above described bag body 2 and discharge port 3 have similar configurations to the above described ones, and thus, the same reference numerals and characters are given to these configurations and their description is omitted below.

With reference to FIG. 20, a medicine bag 801 according to the ninth embodiment includes a cover sheet 852. This cover sheet 852 includes: a light-shielding portion 852*a* which has a similar configuration to the above described light-shielding portion 752*a*; and a concealing portion 852*b* which protrudes downward from this light-shielding portion 852*a*. The light-shielding portion 852*a*, in the same way as the above described light-shielding portion 52*a*, is peelably connected at its peripheral portion P to the front sheet 51 of the upper storage container 6, so that it shields from the light the medicine in the upper division space 5. On the other hand, the concealing portion 852*b* extends in the up-and-down directions and has a strip shape. Its lower-end part is connected at a connection part J1 to the melting-attachment part of the lower storage container 8 (or the melting-attachment part which forms the lower-end part of the lower division space 7), so that it can be peeled. Herein, the medicine bag 801 according to the ninth embodiment is produced in the following method. First, at the same time when the upper-end part of the lower storage container 8 is closed, the upper storage container 6 and the lower storage container 8 are connected. Thereafter, the cover sheet 852 is connected at the peripheral portion P of the light-shielding portion 852*a* to the front sheet 51, so that it can be peeled. Next, the concealing portion 852*b* which protrudes downward from this light-shielding portion 852*a* is connected at the connection part J1 to the melting-attachment part of the lower storage container 8, so that it can be peeled.

The midway part of the concealing portion 852*b* connected to the lower storage container 8 in this way is disposed so that it conceals the whole remaining-quantity numerical-value portion S1, or all the prints of 75 mL, 50 mL and 25 mL. In addition, the concealing portion 852*b* extends to a position slightly below the connection part J1. Thus, this extension part functions as a grasp tab 852*c* for peeling the cover sheet 852 from the bag body 2.

When the medicine bag 801 configured as described above is used, in order to confirm the remaining quantity of the medicines in the medicine storage chamber 4, as described above, the grasp tab 852*c* is grasped, and the concealing portion 852*b* is pulled up which conceals the whole remaining-quantity numerical-value portion S1. Thereby, the concealing portion 852*b* is peeled from the connection part J1. According to this movement, the light-shielding portion 852*a* is also peeled from the peripheral portion P. Thus, after the cover sheet 852 has been peeled from the bag body 2, the above described operations shortly before administered are conducted to administer the mixed medicines to a patient.

As described above, in the medicine bag 801, the concealing portion 852*b* is configured to conceal the whole remaining-quantity numerical-value portion S1. Therefore, When the total quantity of the medicines is confirmed as the series of operations shortly before administered for the purpose of discharging the medicines, the concealing portion 852*b* has to be peeled from the bag body 2. This allows the user to recognize that the concealing portion 852*b* should be peeled from the bag body 2.

Furthermore, in the medicine bag 801 according to the ninth embodiment, the concealing portion 852*b* is attached at the connection part J1 to the bag body 2, so that it can be peeled. Therefore, in order to confirm the total quantity of the medicines, the concealing portion 852*b* needs to be peeled from the bag body 2. As a result, if the concealing portion 852*b* which forms a part of the cover sheet 852 is peeled from the bag body 2, that allows the user to certainly recognize the cover sheet 852 is attached to the bag body 2, and that the cover sheet 852 should be peeled from the bag body 2.

Herein, in the medicine bag 801, the concealing portion 852*b* is configured to conceal the whole remaining-quantity numerical-value portion S1. However, the configuration is not limited to this, and thus, the whole calibration portion M1 can also be concealed. In addition, as described according to the tenth embodiment, the whole of both the remaining-quantity numerical-value portion S1 and the calibration portion M can also be concealed.

Figure 21:
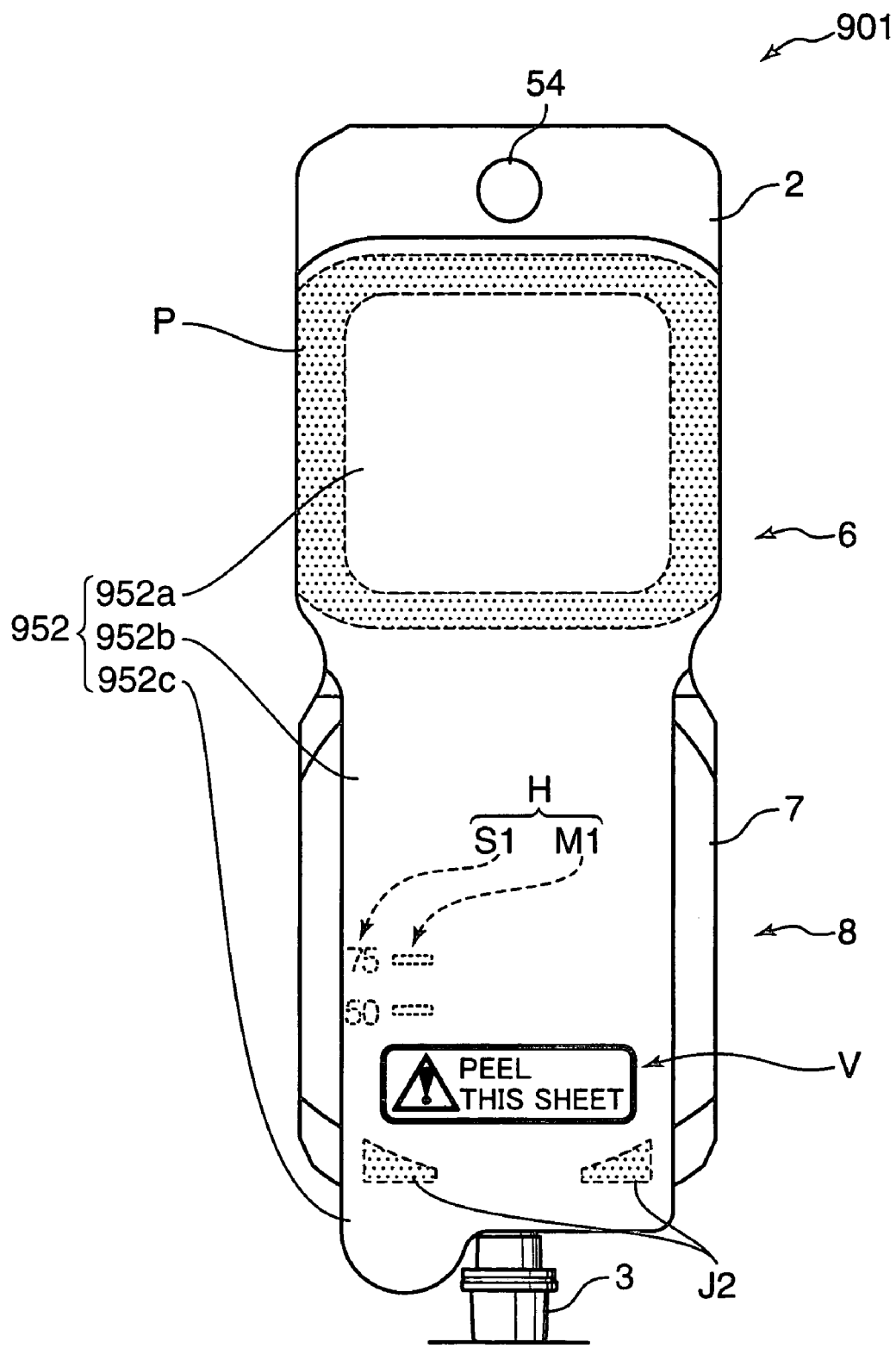
FIG. 21 is a front view of a medicine bag according to a tenth embodiment of the present invention.

FIG. 21 is a front view of the medicine bag according to a tenth embodiment of the present invention. Herein, the above described bag body 2 and discharge port 3 have similar configurations to the above described ones, and thus, the same reference numerals and characters are given to these configurations and their description is omitted below.

With reference to FIG. 21, a medicine bag 901 according to the tenth embodiment includes a cover sheet 952. This cover sheet 952 includes: a light-shielding portion 952*a* which has a similar configuration to the above described light-shielding portion 752a; and a concealing portion 952b which protrudes downward from this light-shielding portion 952a. The light-shielding portion 952a, in the same way as the above described light-shielding portion 752a, is peelably connected at its peripheral portion P to the front sheet 51 of the upper storage container 6, so that it shields from the light the medicine in the upper division space 5. On the other hand, the concealing portion 952b is set to have a slightly narrower measurement than that of the light-shielding portion 952a. It extends along the front surface of the lower storage container 8 in the up-and-down directions. Its lower-end part is connected at a pair of right and left connection parts J2 to the melting-attachment part of the lower storage container 8, so that it can be peeled.

Herein, the medicine bag 901 according to the tenth embodiment is produced in the following method. First, at the same time when the upper-end part of the lower storage container 8 is closed, the upper storage container 6 and the lower storage container 8 are connected. Thereafter, the cover sheet 952 is connected at the peripheral portion P of the light-shielding portion 952a to the front sheet 51, so that it can be peeled. Next, the concealing portion 952b which protrudes downward from this light-shielding portion 952a is connected at the pair of right and left connection parts J2 to the melting-attachment part of the lower storage container 8, so that it can be peeled.

The midway part of the concealing portion 952b connected to the lower storage container 8 in this way is disposed so that it conceals the whole of the remaining-quantity numerical-value portion S1 and the calibration portion M1. In addition, the concealing portion 952b extends on its left side to a position slightly below the connection part J2. Thus, this extension part functions as a grasp tab 952c for peeling the cover sheet 952 from the bag body 2. In addition, on the surface on the side where the concealing portion 952b moves away from the bag body 2 in the concealing portion 952b, a notification column V is printed which displays the fact that the cover sheet 952 needs to be peeled from the bag body 2.

When the medicine bag 901 configured as described above is used, in order to confirm the remaining quantity of the medicines in the medicine storage chamber 4, as described above, the grasp tab 952c is grasped and the concealing portion 952b is pulled up which conceals the remaining-quantity numerical-value portion S1 and the calibration portion M1. Thereby, the concealing portion 952b is peeled from each connection part J2. According to this movement, the light-shielding portion 952a is also peeled from the peripheral portion P. Thus, after the cover sheet 952 has been peeled from the bag body 2, the above described operations shortly before administered are conducted to administer the mixed medicines to a patient.

As described above, in the medicine bag 901, the concealing portion 952b is configured to conceal the whole of the remaining-quantity numerical-value portion S1 and the calibration portion M1. Therefore, When the total quantity of the medicines is confirmed as the series of operations shortly before administered for the purpose of discharging the medicines, the concealing portion 952b has to be peeled from the bag body 2. This allows the user to recognize that the concealing portion 952b should be peeled from the bag body 2.

Furthermore, in the medicine bag 901, on the surface on the side where the concealing portion 952b moves away from the bag body 2 in the concealing portion 952b, a notification column V is printed which displays the fact that the cover sheet 952 needs to be peeled from the bag body 2. Therefore, if the concealing portion 952b is operated in the process of the series of operations when administered, that allows the user to recognize more certainly that the cover sheet 952 should be peeled from the bag body 2. Herein, in the medicine bag 901, the notification column V displays the fact that the cover sheet 952 needs to be peeled from the bag body 2. However, the configuration is not limited to this, for example, it may also display the fact that the cover sheet 952 is concealing the remaining-quantity displaying portion H. In addition, it may also display both of them.

Furthermore, in the medicine bag 901 according to the tenth embodiment, the concealing portion 952b is attached at the connection part J2 to the bag body 2, so that it can be peeled. Therefore, in order to confirm the total quantity of the medicines, the concealing portion 952b needs to be peeled from the bag body 2. As a result, if the concealing portion 952b which forms a part of the cover sheet 952 is peeled from the bag body 2, that allows the user to certainly recognize the cover sheet 952 is attached to the bag body 2, and that the cover sheet 952 should be peeled from the bag body 2.

Furthermore, in the medicine bag, instead of the configuration according to each of the above described embodiments, the following configuration can also be used.

Figure 22:
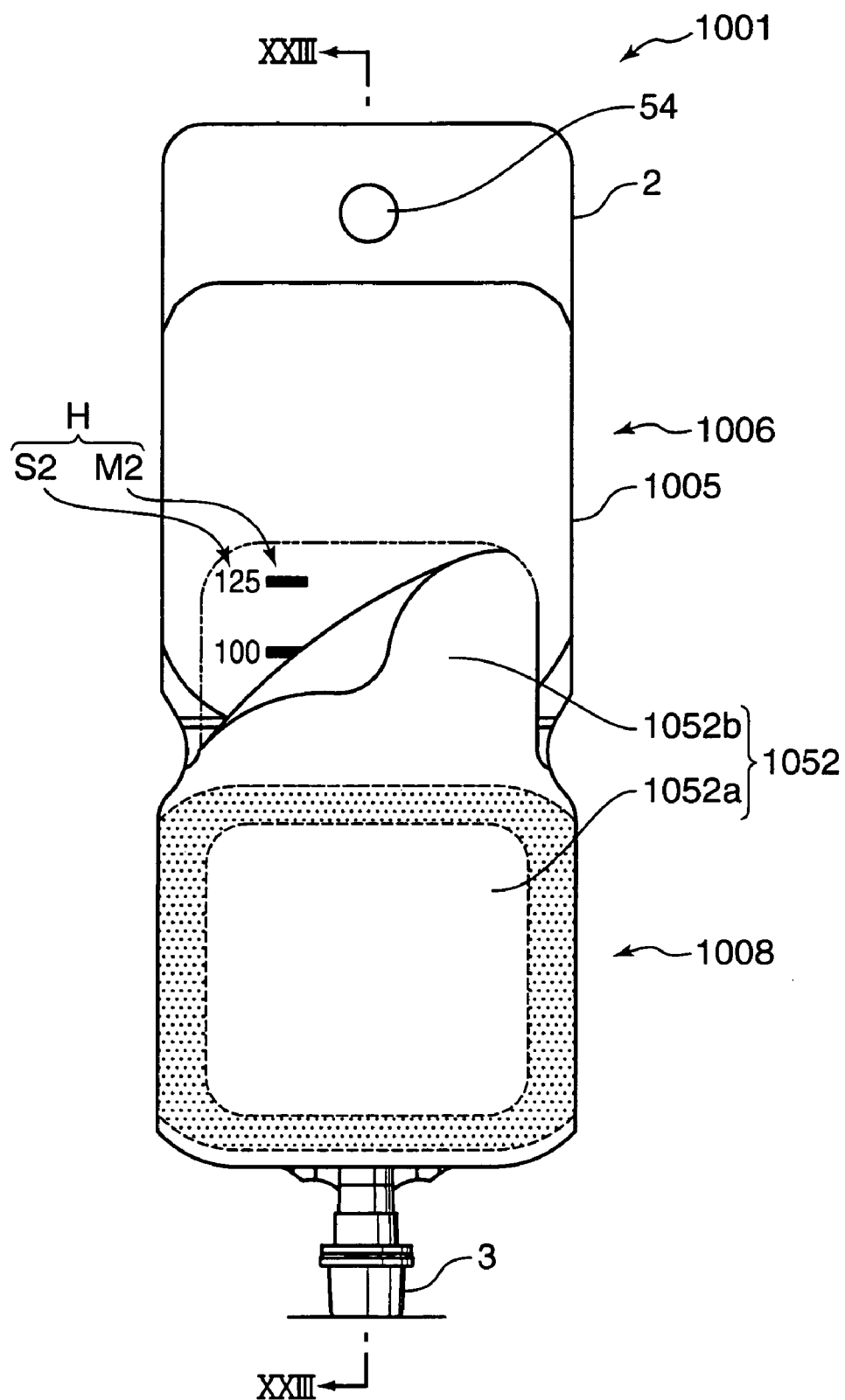
FIG. 22 is a front view of a medicine bag according to an eleventh embodiment of the present invention.
Figure 23:
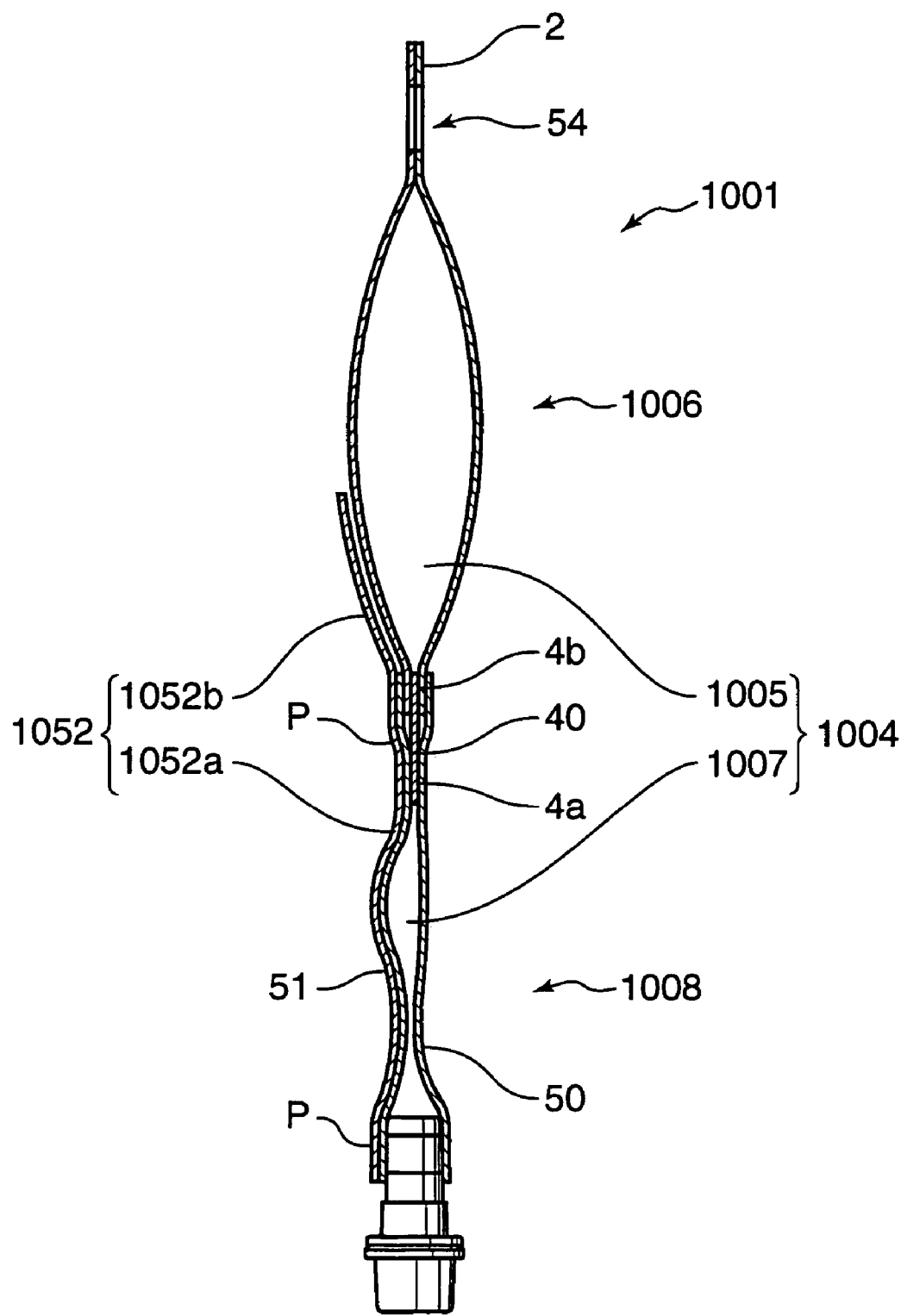
FIG. 23 is a sectional view of the medicine bag, seen along the line XXIII-XXIII in FIG. 22.

FIG. 22 is a front view of a medicine bag according to an eleventh embodiment of the present invention. FIG. 23 is a sectional view, seen along a line XXIII-XXIII in FIG. 22.

With reference to each figure, in a medicine bag 1001 according to the eleventh embodiment, the configuration of the upper storage container 6 and the lower storage container 8 is turned over in the up-and-down directions. Specifically, the discharge port 3 is disposed at the lower-end part of a lower storage container 1008 according to this embodiment which has a similar configuration to the upper storage container 6 according to the first embodiment. On the other hand, the hole 54 is formed in the upper-end part of an upper storage container 1006 according to this eleventh embodiment which has a similar configuration to the lower storage container 8. In other words, while a photo-variable powdered medicine is stored in a lower division space 1007 of the lower storage container 1008, a dissolution liquid for dissolving the powdered medicine is stored in an upper division space 1005 of the upper storage container 1006. These upper division space 1005 and lower division space 1007 are formed by dividing a medicine storage chamber 1004 inside of the bag body 2 by the weak seal portions 4a, 4b (located in the position where those of the above described embodiments are turned over in the up-and-down directions).

On the side surface of the upper storage container 1006, a calibration portion M2 is printed which indicates the height level of the remaining quantity of medicine in the medicine storage chamber 1004. In addition, a remaining-quantity numerical-value portion S2 is printed which corresponds to the calibration portion M2 and shows a numerical value of the remaining quantity of medicine. In other words, the calibration portion M2 indicates the height level of the mixed medicine obtained by mixing the medicine in the upper division space 1005 with the medicine in the lower division space 1007. The remaining-quantity numerical-value portion S2 shows, using numerical values, the quantity of the medicines which corresponds to this height level. According to this eleventh embodiment, in the remaining-quantity numerical-value portion S2, two numerical values of 125 mL and 100 mL are disposed in the up-and-down directions. In the positions which correspond to these, the calibration portion M2 is formed in the up-and-down directions. Herein, according to this embodiment, the calibration portion M2 and the remaining-quantity numerical-value portion S2 form an example of the remaining-quantity displaying portion H. In addition, although omitted in the figures, a remaining-quantity displaying portion for displaying remaining quantities which are smaller than those of the calibration portion M2 and the remaining-quantity numerical-value portion S2 is printed on a side surface of the lower storage container 1008 (which is, in the figures, the part where it is covered with a cover sheet 1052).

In the lower storage container 1008 of the medicine bag 1001 configured as described above, the cover sheet 1052 is connected to the front surface of the front sheet 51, so that it can be peeled. This cover sheet 1052 includes: a light-shielding portion 1052a which shields from the light the medicine in the lower division space 1007; and a concealing portion 1052b which extends out from the upper end of this light-shielding portion 1052a, and is disposed ahead of the upper division space 1005. According to this embodiment, the concealing portion 1052b and the upper storage container 1006 are kept unconnected. Thus, the concealing portion 1052b functions as a grasp tab for peeling the light-shielding portion 1052a from the front sheet 51.

The light-shielding portion 1052a of the cover sheet 1052, as shown in FIG. 17 and FIG. 18, is peelably connected at its peripheral portion P to the front sheet 51, so that it covers the front side of the lower division space 1007. On the other hand, the concealing portion 1052b is set to have a slightly narrower measurement than that of the light-shielding portion 1052a. It extends along the front surface of the upper storage container 1006 in the up-and-down directions. In addition, according to this embodiment, the concealing portion 1052b extends to a midway part of the upper storage container 1006, so that it conceals the whole of the remaining-quantity numerical-value portion S2 and the calibration portion M2 which corresponds to this.

Next, description will be given about the process for using the medicine bag 1001 configured as described above.

First, in order to confirm the total quantity of the medicines in the medicine storage chamber 1004, as described above, the concealing portion 1052b is pulled down which conceals the calibration portion M2 and the remaining-quantity numerical-value portion S2. According to this operation, the light-shielding portion 1052a connected at the peripheral portion P is also peeled from the front sheet 51.

Next, if the upper storage container 1006 of the bag body 2 is pressed by hand, that increases the internal pressure of the upper division space 1005. According to this pressure, the weak seal portions 4a, 4b are peeled, thus allowing the upper division space 1005 to lead to the lower division space 1007. In this state, if the medicine bag 1001 is shaken up and down, the medicines stored in both division spaces 1005, 1007 are mixed. In other words, the medicine stored in the lower division space 1007 is dissolved in the dissolution liquid stored in the upper division space 1005, thus preparing the mixed medicines to be administered to a patient.

Then, the hanger of the bag stand is inserted into the hole 54 of the bag body 2 to hang the medicine bag 1001 (or the bag body 2). Next, the sticking needle is stuck through the portion to be perforated of the discharge port 3. Then, the mixed medicines in the bag body 2 to the patient is administered, through a tube which is connected to the sticking needle.

As described above, in the medicine bag 1001, the concealing portion 1052b of the cover sheet 1052 is configured so that it conceals the remaining-quantity displaying portion H disposed in the upper storage container 1006. Therefore, when the medicine bag 1001 is used, as the series of operations shortly before administered for the purpose of discharging the medicine, the remaining quantity of the medicine is confirmed using the remaining-quantity displaying portion H. To do that, the remaining-quantity displaying portion H has to be exposed from the concealing portion 1052b. In the process of exposing the remaining-quantity displaying portion H from the concealing portion 1052b, if the position of the concealing portion 1052b which forms a part of the cover sheet 1052 is shifted from the bag body 2, that allows the user to recognize the cover sheet 1052 is attached to the bag body 2, and that the cover sheet 1052 should be peeled from the bag body 2. On the other hand, as described above, if the concealing portion 1052b is peeled from the bag body 2, that allows the whole cover sheet 1052 including this concealing portion 1052b to be peeled from the bag body 2. As a result, the light-shielding portion 1052a of the cover sheet 1052 is also peeled from the bag body 2. This allows the user to visually confirm there is the medicine shielded from the light by the light-shielding portion 1052a.

As described above, in the medicine bag 1001, the cover sheet 1052 is certainly peeled in the process of the series of operations shortly before administered. This allows the user to visually confirm the state of the medicines, such as how properly they have been mixed and how well they are preserved. As a result, the medicines can be appropriately administered.

Herein, the medicine bag 701, 801, 901 1001 according to each of the above described embodiments, as described above, includes two division spaces. However, their configuration is not limited to this. A medicine bag which includes a plurality of division spaces, for example, can also be formed, such a medicine bag as shown in FIG. 24.

Figure 24:
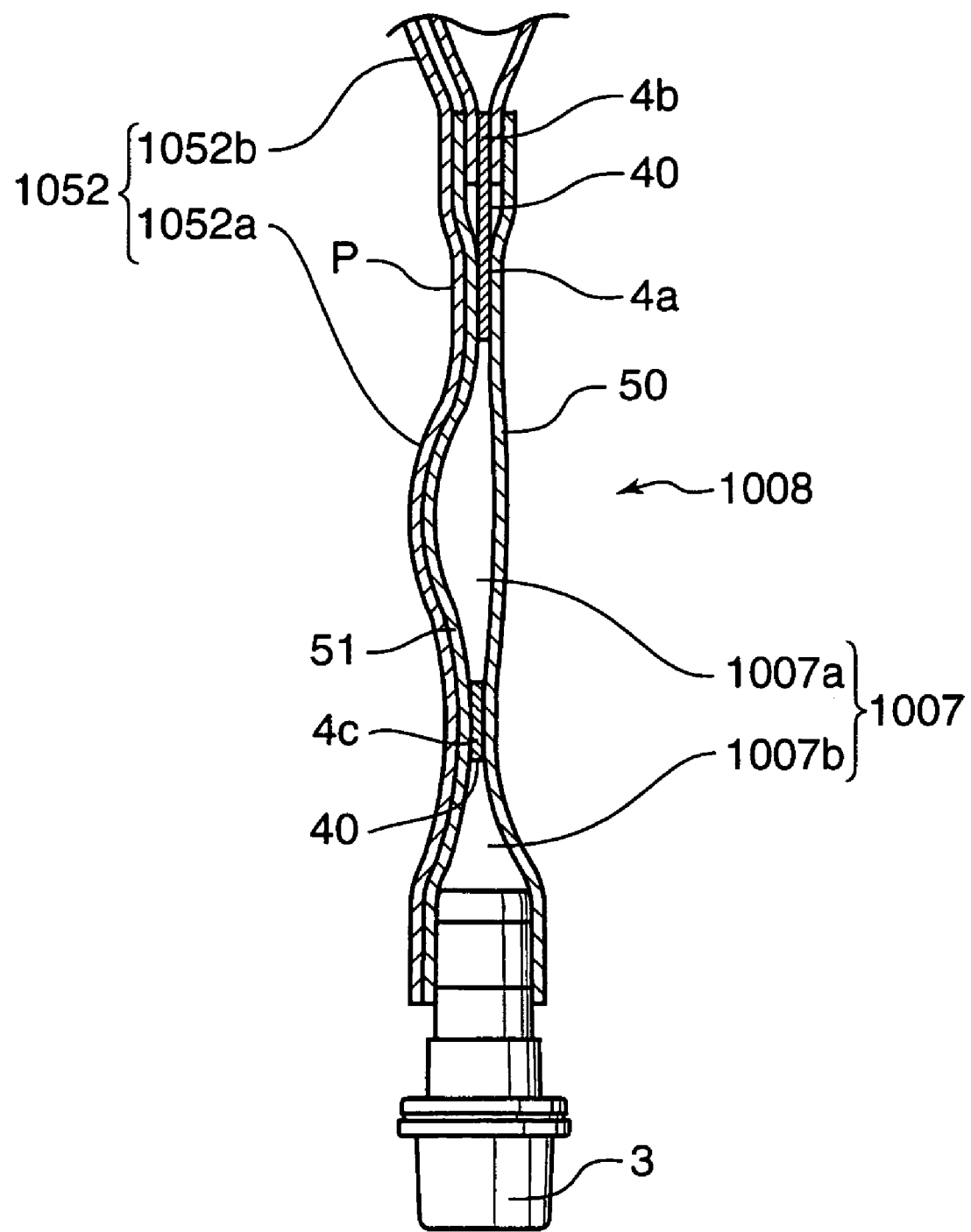
FIG. 24 is a sectional partially schematic view of a variation of the medicine bag in FIG. 23.

FIG. 24 is a sectional partially schematic view of a variation of the medicine bag 1001 in FIG. 23.

With reference to FIG. 24, the medicine bag 1001 is provided with a weak seal portion 4c below the weak seal portion 4a. This weak seal portion 4c divides the lower division space 1007 into two division spaces 1007a, 1007b. The division space (hereinafter, called the lower-side division space 307b) which leads to the discharge port 3 of these division spaces 1007a, 1007b is formed in an empty space where the medicine is not filled.

According to this configuration, even if the series of operations when administered is conducted while the medicines in each division space 1007a, 1005 are not mixed, the medicines in the medicine storage chamber 1004 can be kept because the lower-side division space 1007b which leads to the discharge port 3 is formed in an empty space. This prevents the medicines from being improperly administered. In addition, for example, in the case where a powdered medicine is stored in the lower-side division space 1007b, that medicine can be prevented from going into the discharge port 3, because the lower-side division space 1007b is formed in an empty space. Therefore, a part of the medicine can be prevented from not being dissolved. Besides, as described above, the medicine can be prevented from going into the discharge port 3. Thereby, there is no need to make the discharge port 3 itself of a material which has the property of a barrier, such as a material which does not transmit light and a material which does not transmit oxygen.

In addition, according to each of the above described embodiments, the melting-attachment is conducted via the weak seal sheet 40 to form the weak seal portions 4a, 4b, 4c. However, the configuration is not limited to this. For example, the heating-and-melting time of the weak seal portions 4a, 4b, 4c may also be set to be shorter than the other melting-attachment parts; or its melting-attachment pressure or temperature, to be lower than them. This allows them to be peeled by a weaker external force than the other melting-attachment parts.

Furthermore, in the bag body 2 according to each of the above described embodiments, the upper storage containers 6, 306 and the lower storage container 8, 308 are formed separately. Thus, it is formed by connecting these. However, the specific shape of the bag body is not limited especially. For example, two longer rear sheet and front sheet may also be piled. In that case, both these sheets are melted and attached at their predetermined part to divide the inside of the bag body 2 into a plurality of division spaces.

Moreover, according to the above description, the light-shielding portions 752a, 852a, 952a, 1052a each shield a photo-variable medicine. However, the configuration is not limited to this. For example, an aluminum sheet or the like which covers the medicine may also form the light-shielding portions 752a, 852a, 952a, 1052a for the purpose of preventing each of the oxidation, moisture absorption and transpiration of the medicine. In other words, the light-shielding portions 752a, 852a, 952a, 1052a may only cover the medicine in such a way that it cannot be visually confirmed from the outside.

In addition, the concealing portion 752b, 852b, 952b, 1052b may only cover at least one part of the remaining-quantity displaying portion H. For example, in the remaining-quantity numerical-value portion S1, a part of its figure can also be concealed to an extent where that figure cannot be read, different from the configuration according to each of the above described embodiments.

As described above, a medicine bag includes a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space. The medicine bag comprises: a cover sheet which is peelably attached to the bag body; and a requisitely-used portion which is used in the process shortly before the medicine is administered. The cover sheet includes a light-shielding portion which shields from the light the medicine stored in at least one division space by covering a predetermined part of the light-transmission portion, and a continuously-formed portion which is continuously formed in the light-shielding portion and is placed so that the requisitely-used portion is prevented from being used with the cover sheet kept attached.

With this configuration, the continuously-formed portion of the cover sheet is placed so that the requisitely-used portion is prevented from being used with the cover sheet kept attached. In the case where the medicine bag is used, therefore, as the series of operations shortly before the medicines are administered, the continuously-formed portion placed in the requisitely-used portion needs to be removed. When the continuously-formed portion which prevents the requisitely-used portion from being used by the user is removed, for example, by being peeled, the light-shielding portion in which the continuously-formed portion is continuously formed is also peeled together in this removal process. Thus, the medicines shielded by the light-shielding portion are exposed through the light-transmission portion. This enables the user to visually confirm there are the medicines, and the user to see that the medicines have not been mixed. Hence, in the process of the series of operations shortly before administered, the light-shielding portion is certainly peeled. This allows the user to visually confirm the state of the medicines, such as how properly they have been mixed and how well they are preserved. As a result, the medicines can be appropriately administered.

In the medicine bag, the requisitely-used portion may be a hanger-hooked portion which is provided in the bag body and is used for hanging the bag body. The continuously-formed portion is peelably attached to the bag body so that the hanger-hooked portion is prevented from being used.

With this configuration, the continuously-formed portion is connected to the bag body so that the hanger-hooked portion can be prevented from being used. Therefore, unless the continuously-formed portion is peeled, the bag body cannot be hung, for example, on a hanger of a bag stand. Accordingly, as the series of operations shortly before the mixed medicines are administered to a patient, the user has to peel the continuously-formed portion from the bag body so that the hanger-hooked portion can be shifted from the state in which it is prevented from being used to the state in which it is allowed to be used. Then, when the continuously-formed portion is peeled, the light-shielding portion in which the continuously-formed portion is continuously formed is also peeled together in this peeling process. Thus, the medicines shielded by the light-shielding portion are exposed through the light-transmission portion. This enables the user to visually confirm the state of the medicines, such as how properly they have been mixed and how well they are preserved.

Further, the hanger-hooked portion may be a hole which is formed beforehand in the bag body, and the continuously-formed portion may be connected to the bag body with the hole kept closed.

With this configuration, in the medical field, if the cover sheet is peeled, that will certainly make the hole usable.

Furthermore, the continuously-formed portion may be connected to the bag body, at least in a position opposite to the light-shielding portion with respect to the hole.

With this configuration, the hole can be covered, with the hole certainly kept closed with the continuously-formed portion, or with it prevented from being used. Therefore, as the series of operations shortly before administered, the continuously-formed portion is certainly peeled so that the hole can be opened and used. This also allows the light-shielding portion to be peeled more certainly.

Further, the continuously-formed portion may be connected in a position apart from the periphery of the hole.

In other words, in the case where the hole is formed beforehand in the bag body, if the continuously-formed portion is connected to a predetermined part of the bag body on the periphery of the hole, at that connection part, the bag body may be torn up from the periphery of the hole. Moreover, this may also tear and open the division spaces. Accordingly, as described above, if the continuously-formed portion is configured to be connected in a position apart from the periphery of the hole, that will prevent stress from converging on the periphery of the hole. This effectively prevents the bag body from being torn up.

Furthermore, on the periphery of the hanger-hooked portion, a cut portion may be made beforehand along a part to become the periphery of the hole. The continuously-formed portion may be connected to the inside of the cut portion. A part of the bag body inside of the cut portion may be cut off by peeling the continuously-formed portion to form the hole.

With this configuration, if the continuously-formed portion is simply peeled, that can make the hole usable. Besides, in the hanger-hooked portion, the cut portion is only formed and is not formed as the hole. This allows the continuously-formed portion to be certainly peeled so that the hole can be formed. In addition, this peeling surely prompts the light-shielding portion to be peeled, thus certainly peeling the cover sheet. As a result, the medicines can be visually confirmed.

The cut portion may be perforations. According to this configuration, using a simple configuration, as the continuously-formed portion is peeled, the hole can certainly be formed.

The light-shielding portion and the continuously-formed portion may be integral with each other. With this configuration, as the continuously-formed portion is peeled, the light-shielding portion is peeled more certainly. Besides, the united light-shielding portion and continuously-formed portion can be produced more efficiently than in the case where they are separately produced and connected.

Furthermore, the light-shielding portion may be provided so as to lie over the division space which stores the medicine to be shielded by the light-shielding portion, in the hanging direction. With this configuration, the light-shielding portion is provided so as to lie over the division space which stores the medicine to be shielded by the light-shielding portion, over the full length in the hanging direction. Therefore, if the light-shielding portion is peeled, the inside of the division space can be visually confirmed over the full length in the hanging direction, thereby making the confirmation operation more precise.

Further, the light-shielding portion may cover the light-transmission portion which corresponds to the division space placed near the hole. With this configuration, the continuously-formed portion which is continuously formed in the light-shielding portion can be formed as short as possible. This reduces to the utmost the cost of newly providing the continuously-formed portion.

Moreover, the requisitely-used portion may be a discharge port which is formed in the lower part of the bag body and discharges the medicine in the medicine storage chamber. The continuously-formed portion may be peelably attached to at least one part of the discharge port, so that the medicine is prevented from being discharged from the discharge port.

The continuously-formed portion of the cover sheet may be attached to the discharge port so that the medicine in the medicine storage chamber is prevented from being discharged. Therefore, if the medicine bag is used, as the series of operations shortly before the medicines are administered, the continuously-formed portion needs to be peeled from the discharge port. In the process of peeling the continuously-formed portion from the discharge port, the fact that the continuously-formed portion which is a part of the cover sheet is peeled from the discharge port allows the user to recognize the cover sheet is attached to the bag body, and that the cover sheet should be peeled from the bag body.

In addition, if this continuously-formed portion is peeled from the discharge port, the light-shielding portion in which the continuously-formed portion is continuously formed is also peeled together from the bag body in this peeling process. Thus, the medicines shielded by the light-shielding portion are exposed through the light-transmission portion. This enables the user to visually confirm the state of the medicines, such as how properly they have been mixed and how well they are preserved. Hence, in the above-mentioned medicine bag, the cover sheet is certainly peeled in the process of the series of operations shortly before administered. This allows the user to visually confirm the state of the medicines, such as how properly they have been mixed and how well they are preserved. As a result, the medicines can be appropriately administered.

The continuously-formed portion may be attached to close the outlet of the discharge port. With this configuration, unless the continuously-formed portion is peeled, the medicine in the medicine storage chamber cannot be discharged. Accordingly, as the series of operations shortly before the mixed medicines are administered to a patient, the user has to peel the continuously-formed portion from the discharge port and connect a tube or the like for injecting a patient with the medicines to the discharge port. In this peeling process, the light-shielding portion is also peeled together. Thus, the medicines shielded by the light-shielding portion are exposed through the light-transmission portion. This enables the user to visually confirm the state of the medicines, such as how properly they have been mixed and how well they are preserved.

The continuously-formed portion may include a tamper seal which is detached when the discharge port is used. The tamper seal may be attached to close the outlet of the discharge port. With this configuration, the continuously-formed portion of the cover sheet includes the tamper seal which is detached when the discharge port is used. Therefore, when the medicine bag is used, together with the operation where the tamper seal is detached which is included as the series of operations shortly before administered for the purpose of discharging the medicine, the position of the continuously-formed portion including the tamper seal is also shifted over the bag body. Then, if this continuously-formed portion is peeled from the discharge port, that allows the user to recognize the cover sheet is attached to the bag body, and that the cover sheet should be peeled from the bag body.

Furthermore, if this tamper seal is peeled from the discharge port, the continuously-formed portion including the tamper seal is also peeled. In addition, the light-shielding portion in which the continuously-formed portion is continuously formed is also peeled together from the bag body in this peeling process. Thus, the medicines shielded by the light-shielding portion are exposed through the light-transmission portion. This enables the user to visually confirm the state of the medicines, such as how properly they have been mixed and how well they are preserved. Hence, the cover sheet is certainly peeled in the process of the series of operations shortly before administered. This allows the user to visually confirm the state of the medicines, such as how properly they have been mixed and how well they are preserved. As a result, the medicines can be appropriately administered.

Moreover, as described above, the continuously-formed portion includes the tamper seal, and thus, the continuously-formed portion can be formed, for example, using an existing tamper seal. This allows the medicine bag according to the present invention to be relatively easily produced, while the conventional method of producing a medicine bag can be maintained as much as possible.

Herein, the tamper seal is a seal which is provided for proving that a medicine bag is not yet used. In other words, unless the tamper seal is detached, a liquid medicine is not discharged from the discharge port.

The requisitely-used portion may be a discharge port which is formed in the lower part of the bag body and discharges the medicine in the medicine storage chamber. The continuously-formed portion may be disposed to cover the discharge port, so that the medicine is prevented from being discharged from the discharge port.

With this configuration, the continuously-formed portion of the cover sheet is disposed to cover the discharge port. Therefore, it needs to be shifted from this covering position to an exposure position in which the discharge port is exposed. If the continuously-formed portion which is a part of the cover sheet is shifted to the exposure position, that allows the user to recognize the cover sheet is attached to the bag body, and that the cover sheet should be peeled from the bag body.

Furthermore, if this continuously-formed portion is shifted to the exposure position, the light-shielding portion in which the continuously-formed portion is continuously formed is also peeled together from the bag body in this shifting process. Thus, the medicines shielded by the light-shielding portion are exposed through the light-transmission portion. This enables the user to visually confirm the state of the medicines, such as how properly they have been mixed and how well they are preserved. Hence, the cover sheet is certainly peeled in the process of the series of operations shortly before administered. This allows the user to visually confirm the state of the medicines, such as how properly they have been mixed and how well they are preserved. As a result, the medicines can be appropriately administered.

Further, both surfaces of the bag body may be covered with a pair of opposite cover sheets. A pair of opposite continuously-formed portions of the cover sheets may be peelably connected to each other to cover the discharge port. With this configuration, when the medicine bag is used, the continuously-formed portions need to be peeled from each other. This peeling process allows the user to recognize each cover sheet is attached to the bag body, and that each cover sheet should be peeled from the bag body.

Furthermore, if these continuously-formed portions are peeled, the light-shielding portion in which the continuously-formed portions are continuously formed is also peeled together from the bag body in this peeling process. Thus, the medicines shielded by the light-shielding portion are exposed through the light-transmission portion. This enables the user to visually confirm the state of the medicines, such as how properly they have been mixed and how well they are preserved.

The division space which leads to the discharge port may be formed in an empty space where the medicine is not filled. With this configuration, even if the series of operations shortly before administered are conducted in a state where the medicines in the division spaces are not mixed, the medicines in the medicine storage chamber can be kept from being discharged. This is because the division space which leads to the discharge port is formed in an empty space. Therefore, the medicines can be prevented from being improperly administered.

On the surface on the side opposite to the bag body in the continuously-formed portion, a notification column may be formed which displays the fact that the cover sheet needs to be peeled from the bag body. With this configuration, when the continuously-formed portion is operated in the process of the series of operations shortly before administered, the user can more certainly recognize that the cover sheet should be peeled from the bag body.

The requisitely-used portion may be a remaining-quantity displaying portion which is provided on the surface of the bag body and displays a remaining quantity of the medicine stored in the medicine storage chamber. The continuously-formed portion may conceal at least one part of the remaining-quantity displaying portion which is provided in the division space except the division space shielded by the light-shielding portion.

With this configuration, the continuously-formed portion of the cover sheet conceals at least one part of the remaining-quantity displaying portion which is provided in the division space except the division space shielded by the light-shielding portion. Therefore, when the medicine bag is used, as the series of operations shortly before administered for the purpose of discharging the medicines, the total quantity of the medicines is confirmed using the remaining-quantity displaying portion. Therefore, the remaining-quantity displaying portion concealed with the continuously-formed portion needs to be exposed. In the process of exposing the remaining-quantity displaying portion, a positional shift of the continuously-formed portion which is a part of the cover sheet allows the user to recognize the cover sheet is attached to the bag body, and that the cover sheet should be peeled from the bag body.

In addition, if the position of this continuously-formed portion is shifted, the light-shielding portion in which the continuously-formed portion is continuously formed is also peeled together from the bag body in this shifting process. Thus, the medicines shielded by the light-shielding portion are exposed through the light-transmission portion. This enables the user to visually confirm the state of the medicines, such as how properly they have been mixed and how well they are preserved. Hence, the cover sheet is certainly peeled in the process of the series of operations shortly before administered. This allows the user to visually confirm the state of the medicines, such as how properly they have been mixed and how well they are preserved. As a result, the medicines can be appropriately administered.

The remaining-quantity displaying portion may include a calibration portion which indicates the height level of the remaining quantity of medicine, and a remaining-quantity numerical-value portion which corresponds to the calibration portion and shows a numerical value of the remaining quantity of medicine; and the continuously-formed portion conceals at least one part of the calibration portion, at least one part of the remaining-quantity numerical-value portion, or at least one part of both of these.

With this configuration, the continuously-formed portion conceals at least one part of the calibration portion, at least one part of the remaining-quantity numerical-value portion, or at least one part of both of these. Therefore, for example, a part of the calibration portion which indicates the remaining quantity of medicine before administered (or which shows the total quantity of the medicines in the medicine storage chamber) is concealed. Thereby, if the total quantity of the medicines is confirmed as the series of operations when administered for the purpose of discharging the medicines, the continuously-formed portion needs to be peeled from the bag body. This allows the light-shielding portion to be certainly peeled together with the continuously-formed portion.

The continuously-formed portion may conceal at least one calibration portion, and the remaining-quantity numerical-value portion which corresponds to this calibration portion. With this configuration, the continuously-formed portion conceals, for example, the calibration portion which indicates the remaining quantity of medicine before administered, and the remaining-quantity numerical-value portion which corresponds to this calibration portion. Thereby, if the total quantity of the medicines is confirmed as the series of operations shortly before administered for the purpose of discharging the medicines, the continuously-formed portion needs to be peeled from the bag body. This allows the light-shielding portion to be certainly peeled together with the continuously-formed portion.

The continuously-formed portion may conceal the whole calibration portion, the whole remaining-quantity numerical-value portion, or the whole of both of these.

With this configuration, the continuously-formed portion conceals, for example, the whole calibration portion. Thereby, if the total quantity of the medicines is confirmed as the series of operations when administered for the purpose of discharging the medicines, the continuously-formed portion needs to be peeled from the bag body. This allows the light-shielding portion to be certainly peeled together with the continuously-formed portion.

On the surface on the side opposite to the bag body in the continuously-formed portion, a notification column may be formed which displays the fact that the cover sheet needs to be peeled from the bag body, the fact that the continuously-formed portion conceals the remaining-quantity displaying portion, or both of these.

With this configuration, if the continuously-formed portion is operated in the process of the series of operations shortly before administered, the user can more certainly recognize that the cover sheet should be peeled from the bag body.

The continuously-formed portion may be peelably attached to the bag body. With this configuration, the continuously-formed portion needs to be peeled from the bag body so that the total quantity of the medicines can be confirmed. This allows the light-shielding portion to be certainly peeled from the bag body, together with the continuously-formed portion.

As described above, in the medicine bag, the continuously-formed portion of the cover sheet is placed so that the requisitely-used portion is prevented from being used with the cover sheet kept attached to the bag body. Therefore, the continuously-formed portion has to be removed from the requisitely-used portion so that the requisitely-used portion can be used. This continuously-formed portion is continuously formed in the light-shielding portion which shields from the light the medicine stored in at least one division space. Thus, the removal of the continuously-formed portion allows the light-shielding portion to be peeled together from the bag body. This peeling of the light-shielding portion allows its correspondent light-transmission portion to be exposed. Through this exposed light-transmission portion, the user can visually confirm the state of the medicines shielded by the light-shielding portion, such as how well they are preserved and how properly they have been mixed. Hence, when the medicines are administered to a patient, the light-shielding portion is certainly peeled. Then, through this light-transmission portion which has been peeled and exposed, the user can visually confirm the state of the medicines shielded by the light-shielding portion, such as how well they are preserved and how properly they have been mixed. As a result, the mixed medicines can be appropriately administered to a patient.

This application is based on Japanese Patent Application Nos. 2003-86270, 2003-92661, and 2003-101632, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A medicine bag comprising:

a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space;

a cover sheet which is peelably attached to the bag body; and a requisitely-used portion which is used in the process shortly before the medicine is administered, wherein the cover sheet includes:

a light-shielding portion which shields from the light the medicine stored in at least one division space by covering a predetermined part of the light-transmission portion; and a continuously-formed portion which is continuously formed in the light-shielding portion and is placed so that the requisitely-used portion is prevented from being used with the cover sheet kept attached, and wherein the requisitely-used portion is a hanger-hooked portion which is provided in the bag body and is used for hanging the bag body; and the continuously-formed portion is peelably attached to the bag body so that the hanger-hooked portion is prevented from being used, the hanger-hooked portion is defined by a hole which is formed beforehand in the bag body, and the continuously-formed portion is connected to the bag body with the hole kept closed, and the continuously-formed portion is connected to the bag body at least in a position opposite to the light-shielding portion with respect to the hole.

2. A medicine bag comprising:

a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space;

a cover sheet which is peelably attached to the bag body; and a requisitely-used portion which is used in the process shortly before the medicine is administered, wherein the cover sheet includes:

a light-shielding portion which shields from the light the medicine stored in at least one division space by covering a predetermined part of the light-transmission portion; and a continuously-formed portion which is continuously formed in the light-shielding portion and is placed so that the requisitely-used portion is prevented from being used with the cover sheet kept attached, and wherein the requisitely-used portion is a hanger-hooked portion which is provided in the bag body and is used for hanging the bag body; and the continuously-formed portion is peelably attached to the bag body so that the hanger-hooked portion is prevented from being used, the hanger-hooked portion is defined by a hole which is formed beforehand in the bag body, and the continuously-formed portion is connected to the bag body with the hole kept closed, and the continuously-formed portion is connected in a position apart from the periphery of the hole.

3. A medicine bag comprising:

a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space;

a cover sheet which is peelably attached to the bag body; and a requisitely-used portion which is used in the process shortly before the medicine is administered, wherein the cover sheet includes:

a light-shielding portion which shields from the light the medicine stored in at least one division space by covering a predetermined part of the light-transmission portion; and a continuously-formed portion which is continuously formed in the light-shielding portion and is placed so that the requisitely-used portion is prevented from being used with the cover sheet kept attached, and wherein the requisitely-used portion is a hanger-hooked portion which is provided in the bag body and is used for hanging the bag body; and the continuously-formed portion is peelably attached to the bag body so that the hanger-hooked portion is prevented from being used, and on the periphery of the hanger-hooked portion, a cut portion is made beforehand along a part to become the periphery of the hole; the continuously-formed portion is connected to the inside of the cut portion; and a part of the bag body inside of the cut portion is cut off by peeling the continuously-formed portion to form the hole.

4. The medicine bag according to claim 3, wherein the cut portion has perforations.

5. The medicine bag according to claims 1, 2, or 3, wherein the light-shielding portion and the continuously-formed portion are integral with each other.

6. The medicine bag according to claims 1, 2, or 3, wherein the light-shielding portion is provided so as to lie over the division space which stores the medicine to be shielded by the light-shielding portion, in a hanging direction.

7. The medicine bag according to claims 1 or 2, wherein the light-shielding portion covers the light-transmission portion provided in the division space near the hole.

8. A medicine bag comprising:

a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space;

a cover sheet which is peelably attached to the bag body; and a requisitely-used portion which is used in the process shortly before the medicine is administered, wherein the cover sheet includes:

a light-shielding portion which shields from the light the medicine stored in at least one division space by covering a predetermined part of the light-transmission portion; and a continuously-formed portion which is continuously formed in the light-shielding portion and is placed so that the requisitely-used portion is prevented from being used with the cover sheet kept attached, and wherein the requisitely-used portion is a discharge port which is formed in the lower part of the bag body and discharges the medicine in the medicine storage chamber; and the continuously-formed portion is peelably attached to at least one part of the discharge port so that the medicine is prevented from being discharged from the discharge port, the continuously-formed portion is attached to close the outlet of the discharge port, and the continuously-formed portion includes a tamper seal which is detached when the discharge port is used; and the tamper seal is attached to close the outlet of the discharge port.

9. A medicine bag comprising:

a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space;

a cover sheet which is peelably attached to the bag body; and a requisitely-used portion which is used in the process shortly before the medicine is administered, wherein the cover sheet includes:

a light-shielding portion which shields from the light the medicine stored in at least one division space by covering a predetermined part of the light-transmission portion; and a continuously-formed portion which is continuously formed in the light-shielding portion and is placed so that the requisitely-used portion is prevented from being used with the cover sheet kept attached, and wherein the requisitely-used portion is a discharge port which is formed in the lower part of the bag body and discharges the medicine in the medicine storage chamber; and the continuously-formed portion is peelably attached to at least one part of the discharge port so that the medicine is prevented from being discharged from the discharge port, and the division space which leads to the discharge port is formed in an empty space where the medicine is not filled.

10. A medicine bag comprising:

a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space;

a cover sheet which is peelably attached to the bag body; and a requisitely-used portion which is used in the process shortly before the medicine is administered, wherein the cover sheet includes:
- a light-shielding portion which shields from the light the medicine stored in at least one division space by covering a predetermined part of the light-transmission portion; and
- a continuously-formed portion which is continuously formed in the light-shielding portion and is placed so that the requisitely-used portion is prevented from being used with the cover sheet kept attached, and wherein
- the requisitely-used portion is a discharge port which is formed in the lower part of the bag body and discharges the medicine in the medicine storage chamber; and the continuously-formed portion is peel ably attached to at least one part of the discharge port so that the medicine is prevented from being discharged from the discharge port, and
- on the surface on the side opposite to the bag body in the continuously-formed portion, a notification column is formed which displays the fact that the cover sheet needs to be peeled from the bag body.

11. A medicine bag comprising:

a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space;

a cover sheet which is peelably attached to the bag body; and a requisitely-used portion which is used in the process shortly before the medicine is administered, wherein the cover sheet includes:
- a light-shielding portion which shields from the light the medicine stored in at least one division space by covering a predetermined part of the light-transmission portion; and
- a continuously-formed portion which is continuously formed in the light-shielding portion and is placed so that the requisitely-used portion is prevented from being used with the cover sheet kept attached, and
- wherein the requisitely-used portion is a discharge port which is formed in the lower part of the bag body and discharges the medicine in the medicine storage chamber; and the continuously-formed portion is disposed to cover the discharge port so that the medicine is prevented from being discharged from the discharge port, and
- the division space which leads to the discharge port is formed in an empty space where the medicine is not filled.

12. A medicine bag comprising:

a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space;

a cover sheet which is peelably attached to the bag body; and a requisitely-used portion which is used in the process shortly before the medicine is administered, wherein the cover sheet includes:
- a light-shielding portion which shields from the light the medicine stored in at least one division space by covering a predetermined part of the light-transmission portion; and
- a continuously-formed portion which is continuously formed in the light-shielding portion and is placed so that the requisitely-used portion is prevented from being used with the cover sheet kept attached, and wherein the requisitely-used portion is a discharge port which is formed in the lower part of the bag body and discharges the medicine in the medicine storage chamber; and the continuously-formed portion is disposed to cover the discharge port so that the medicine is prevented from being discharged from the discharge port, and on the surface on the side opposite to the bag body in the continuously-formed portion, a notification column is formed which displays the fact that the cover sheet needs to be peeled from the bag body.

13. A medicine bag comprising:

a bag body having a medicine storage chamber that stores a medicine in such a way that the medicine is visually confirmed through a light-transmission portion provided in at least one part thereof, the bag body having a weak seal portion that divides the medicine storage chamber into a plurality of division spaces, and the sealing of the weak seal portion adjacent to a specific division space being removed by increasing the internal pressure of that division space;

a cover sheet which is peelably attached to the bag body; and a requisitely-used portion which is used in the process shortly before the medicine is administered, wherein the cover sheet includes:
- a light-shielding portion which shields from the light the medicine stored in at least one division space by covering a predetermined part of the light-transmission portion; and
- a continuously-formed portion which is continuously formed in the light-shielding portion and is placed so that the requisitely-used portion is prevented from being used with the cover sheet kent attached, and wherein the requisitely-used portion is a remaining-quantity displaying portion which is provided on the surface of the bag body and displays a remaining quantity of the medicine stored in the medicine storage chamber; and the continuously-formed portion conceals at least one part of the remaining-quantity displaying portion which is provided in the division space except the division space shielded by the light-shielding portion.

14. The medicine bag according to claim 13, wherein the remaining-quantity displaying portion includes a calibration portion which indicates the height level of the remaining quantity of medicine, and a remaining-quantity numerical-value portion which corresponds to the calibration portion and shows a numerical value of the remaining quantity of medicine; and the continuously-formed portion conceals at least one part of the calibration portion, at least one part of the remaining-quantity numerical-value portion, or at least one part of both of these.

15. The medicine bag according to claim 13, wherein the continuously-formed portion conceals at least one calibration portion, and a remaining-quantity numerical-value portion which corresponds to this calibration portion.

16. The medicine bag according to claim 13, wherein the continuously-formed portion conceals a whole calibration portion, a whole remaining-quantity numerical-value portion, or the whole of both of these.

17. The medicine bag according to claim 13, wherein on the surface on the side opposite to the bag body in the continuously-formed portion, a notification column is formed which displays the fact that the cover sheet needs to be peeled from the bag body, the fact that the continuously-formed portion conceals the remaining-quantity displaying portion, or both of these.

18. The medicine bag according to claim 13, wherein the continuously-formed portion is peelably attached to the bag body.

* * * * *